US011824477B2

(12) United States Patent
Morisaki

(10) Patent No.: US 11,824,477 B2
(45) Date of Patent: Nov. 21, 2023

(54) ROTARY ELECTRIC MACHINE CONTROL DEVICE

(71) Applicant: Mitsubishi Electric Corporation, Tokyo (JP)

(72) Inventor: Chiharu Morisaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 118 days.

(21) Appl. No.: 17/599,809

(22) PCT Filed: Aug. 20, 2019

(86) PCT No.: PCT/JP2019/032361
§ 371 (c)(1),
(2) Date: Sep. 29, 2021

(87) PCT Pub. No.: WO2020/261586
PCT Pub. Date: Dec. 30, 2020

(65) Prior Publication Data
US 2022/0200491 A1 Jun. 23, 2022

(30) Foreign Application Priority Data
Jun. 26, 2019 (JP) .................................. 2019-118105

(51) Int. Cl.
*H02P 5/74* (2006.01)
*H02P 25/22* (2006.01)

(52) U.S. Cl.
CPC ................ *H02P 5/74* (2013.01); *H02P 25/22* (2013.01)

(58) Field of Classification Search
CPC ........... H02P 5/74; H02P 25/22; H02P 29/028
(Continued)

(56) References Cited

U.S. PATENT DOCUMENTS 7,759,888 B2 * 7/2010 Matsui ................. H02H 7/0805
318/400.29
9,231,465 B2 * 1/2016 Hara .................... B62D 5/0463
(Continued)

FOREIGN PATENT DOCUMENTS

JP 08-223990 A 8/1996
JP 2003-102189 A 4/2003
(Continued)

OTHER PUBLICATIONS

Japanese Office Action of Patent Application No. 2019-118105 dated Oct. 29, 2019.
(Continued)

*Primary Examiner* — David Luo
(74) *Attorney, Agent, or Firm* — Sughrue Mion, PLLC; Richard C. Turner

(57) ABSTRACT

A rotary electric machine control device includes: a plurality of mutually-independent motor system lines, each having a motor with a servomechanism and a drive controller for driving and controlling the motor (3); and a cooperative controller which, when occurrence of a failure of the drive controller is detected in one motor system line in the plurality of the motor system lines, establishes a connection path for causing the motor of the one motor system line where the occurrence of the failure has been detected, to be driven using at least one part of the drive controller in another motor system line in that motor system lines.

17 Claims, 14 Drawing Sheets

(58) Field of Classification Search
USPC .................................................. 318/496, 34
See application file for complete search history.

(56) References Cited

U.S. PATENT DOCUMENTS 9,964,582 B2 * 5/2018 Tsutsumi .................. H02P 6/28
10,093,348 B2 * 10/2018 Hales ....................... H02P 5/74

FOREIGN PATENT DOCUMENTS

| JP | 2017-022915 A | 1/2017 |
| JP | 2017-073875 A | 4/2017 |

OTHER PUBLICATIONS

International Search Report for PCT/JP2019/032361 dated Nov. 5, 2019.
Written Opinion for PCT/JP2019/032361 dated Nov. 5, 2019.

\* cited by examiner

ROTARY ELECTRIC MACHINE CONTROL DEVICE

CROSS REFERENCE TO RELATED APPLICATIONS

This application is a National Stage of International Application No. PCT/JP2019/032361 filed Aug. 20, 2019, claiming priority based on Japanese Patent Application No. 2019-118105 filed Jun. 26, 2019.

TECHNICAL FIELD

The present application relates to a rotary electric machine control device.

BACKGROUND ART

An electric motor control device is disclosed in which, as a protection mechanism for preventing an erroneous operation of a motor at the occurrence of a failure in a driving device of the motor, a relay is located between the driving device and the motor, so that power supply is suspended thereby at the time of the failure (see, for example, Patent Document 1). In another aspect, a driving device is disclosed in which its drive control unit is duplicated (see, for example, Patent Document 2).

CITATION LIST

Patent Document

Patent Document 1: Japanese Patent Application Laid-open No. 2017-22915 (Paragraphs 0023 to 0026; FIG. 3)
Patent Document 2: Japanese Patent Application Laid-open No. 2003-102189 (Paragraphs 0003 to 0010; FIG. 1 to FIG. 4)

SUMMARY OF THE INVENTION

Problems to be Solved by the Invention

However, for example, in a system such as an electric brake of a vehicle, or the like, that requires to be controlled by a rotational angle or position of the motor, the state of the motor at the time the relay is made open, has a large effect on the subsequent control of the vehicle, so that it is unable to achieve adequate control merely by suspending the power supply at the time of a failure. Further, for example, many servomotors are required in a vehicle, so that when the duplication is applied, the number of the driving devices increases significantly, thus causing a problem that the configuration of the total system is enlarged.

This application discloses a technique for solving the problem as described above, and an object thereof is to provide a rotary electric machine control device which can stably control the servomotors, while reducing enlargement of the system.

Means for Solving the Problems

A rotary electric machine control device disclosed in this application is characterized by comprising: a plurality of mutually-independent motor system lines, each having a motor with a servomechanism and a drive control unit for driving and controlling the motor; and a cooperative control mechanism which, when occurrence of a failure of the drive control unit is detected in one motor system line in the plurality of the motor system lines, establishes a connection path for causing the motor in said one motor system line where the occurrence of the failure has been detected, to be driven using at least one part of the drive control unit in another motor system line in that motor system lines.

Effect of the Invention

According to the rotary electric machine control device disclosed in this application, because it is configured so that the motor in the motor system line where the failure has been detected is controlled by employing the drive control unit to be used for the other motor, it is possible to stably control the servomotors, while reducing enlargement of the system.

MODES FOR CARRYING OUT THE INVENTION

Embodiment 1

Figure 1:
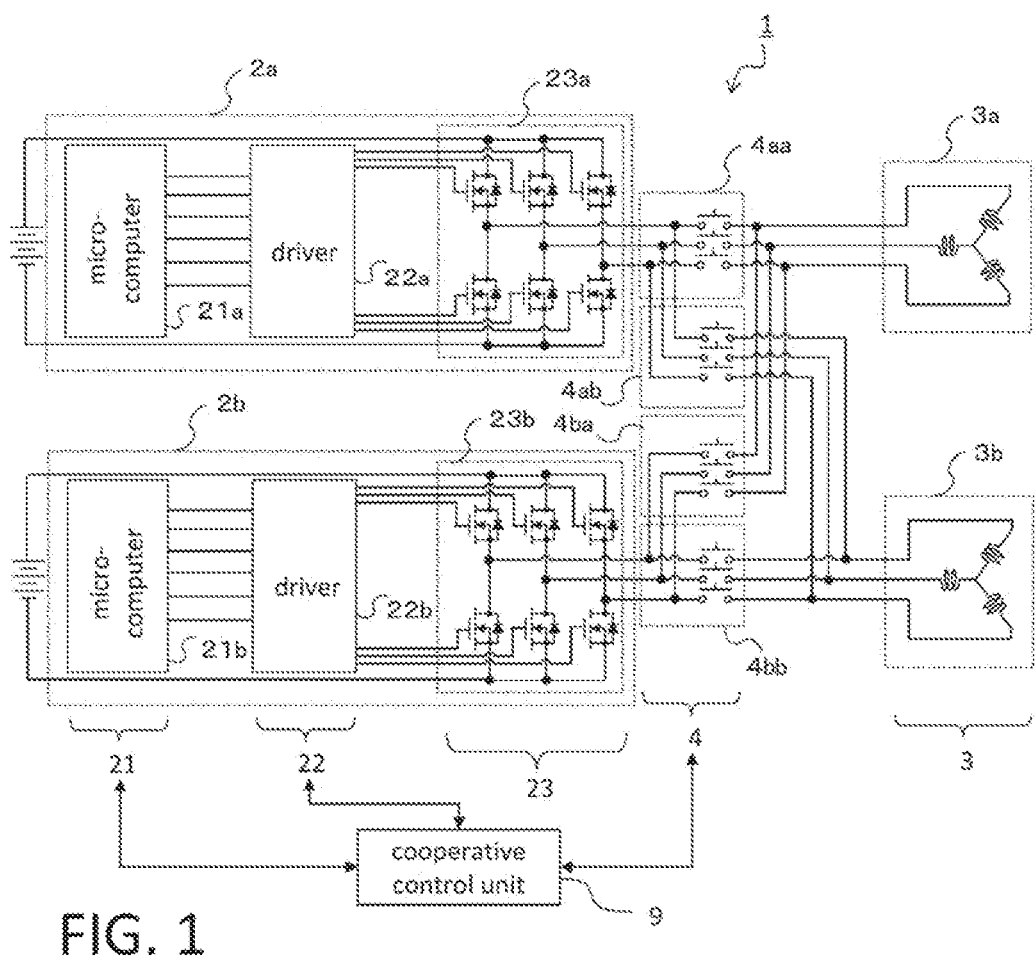
FIG. 1 is a block diagram for illustrating a configuration of a rotary electric machine control device according to Embodiment 1.
Figure 2:
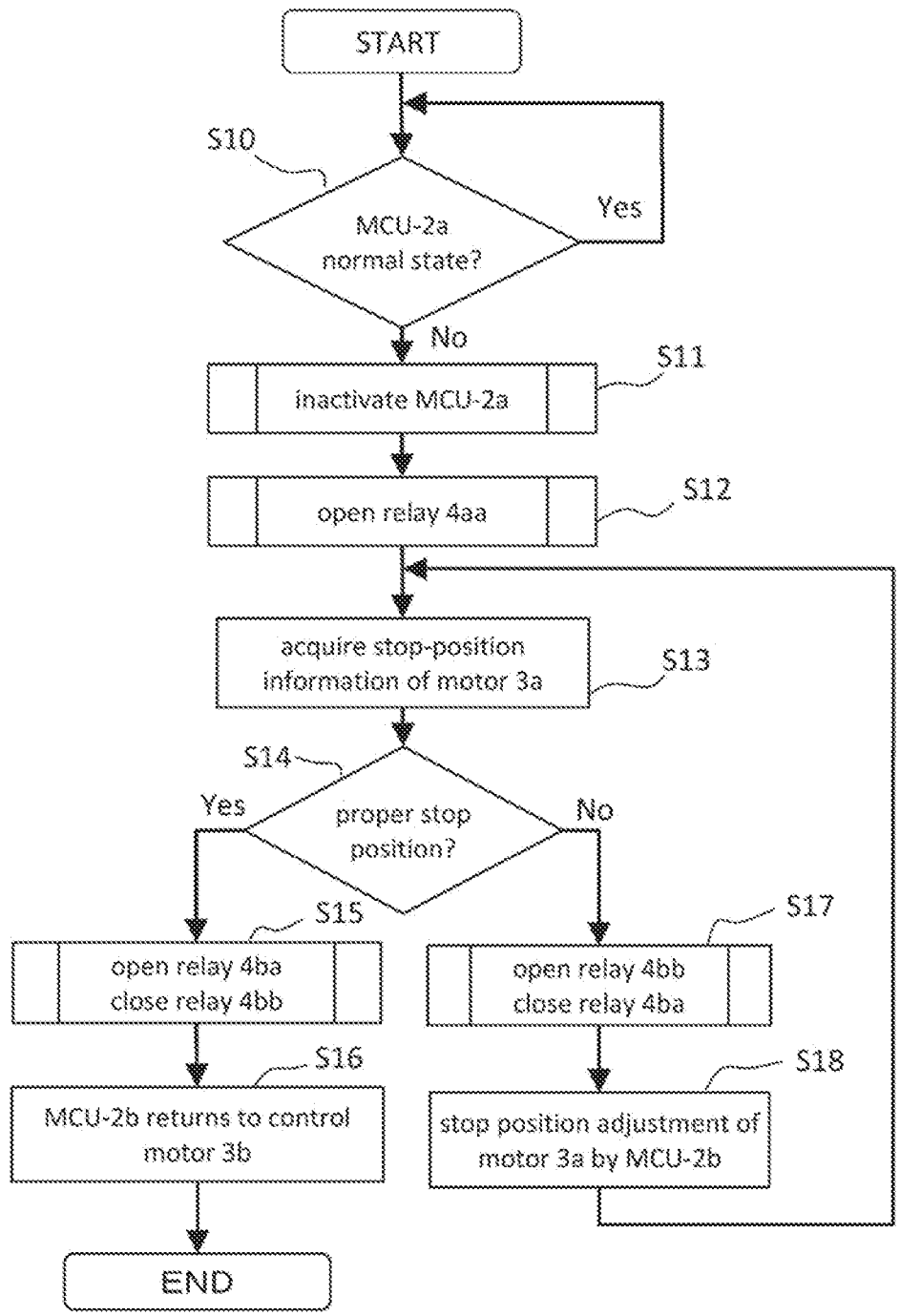
FIG. 2 is a flowchart for illustrating an operation example of the rotary electric machine control device according to Embodiment 1.

FIG. 1 and FIG. 2 are provided for illustrating a configuration and operations of a rotary electric machine control device according to Embodiment 1, in which FIG. 1 is a block diagram for illustrating the configuration of the rotary electric machine control device, and FIG. 2 is a flowchart for illustrating the operations at the occurrence of a failure in one of drive control units in the rotary electric machine control device.

As shown in FIG. 1, in a rotary electric machine control device 1 according to Embodiment 1, a motor system line in which a motor 3a is driven and controlled by a drive control unit 2a, and a motor system line in which a motor 3b is driven and controlled by a drive control unit 2b, are formed. Further, the drive control units 2a, 2b in the respective motor system lines are connected through relays 4 to the motors 3a, 3b, respectively. Furthermore, the rotary electric machine control device is configured to include a cooperative control unit 9 for controlling the drive control units 2a, 2b (or, microcomputers 21a, 21b and drivers 22a, 22b that constitute the respective units) and the relays 4 in the respective motor system lines, in a cooperative manner.

For example, the drive control unit 2a has, as main components, a bridge circuit 23a for converting power from a DC power source with no reference symbol into AC power, the driver 22a for driving the bridge circuit 23a, and the microcomputer 21a for controlling operations of the driver 22a. In addition, it is configured to control the motor 3a as an AC servomotor, separately and independently of the drive control unit 2b. Likewise, the drive control unit 2b has a bridge circuit 23b for converting power from a DC power source with no reference symbol into AC power, the driver 22b for driving the bridge circuit 23b, and the microcomputer 21b for controlling operations of the driver 22b. In addition, it is configured to control the motor 3b as an AC servomotor, separately and independently of the drive control unit 2a.

Meanwhile, although the AC power from the bridge circuit 23a of the drive control unit 2a is outputted through a normally-closed relay 4aa among the relays 4 to the motor 3a, it is also designed to be capable of being outputted through a relay 4ab to the motor 3b. Likewise, although the AC power from the bridge circuit 23b of the drive control unit 2b is outputted through a normally-closed relay 4bb among the relays 4 to the motor 3b, it is designed to be capable of being outputted through a relay 4ba to the motor 3a, as well.

Further, the drive control units 2a, 2b each confirm the stop-position information (rotation angle) of the motor, by means of any one of a variety of sensors, such as, an unshown angle sensor provided on each of the motors 3a, 3b, or, in the case of a system in which the motor rotation is converted into a pressure, a pressure sensor or the like. Further, the drive control units 2a, 2b are configured so that the position information of the motor 3a and the motor 3b is communicated between the microcomputers 21a, 21b, directly or through the cooperative control unit 9.

It is noted that, in this Embodiment and the subsequent Embodiments, when the drive control units 2a, 2b are not to be described distinctively, they may be referred to collectively as drive control units 2. Likewise, when the microcomputers, the drivers, the bridge circuits and the motors are not to be described distinctively for each of the drive system lines, they may be referred to as microcomputers 21, drivers 22, bridge circuits 23 and motors 3, respectively.

With respect to the rotary electric machine control device 1 thus provided with the drive control units 2a, 2b for independently driving the respective motors 3a, 3b, operations of the cooperative control unit 9 at the occurrence of a failure in one drive control unit 2a, will be described using the flowchart in FIG. 2 as a reference. Note that in the flowchart, because of the space for notations, a symbol "MCU" (Motor Control Unit) is used to indicate the drive control unit, so that, for example, "drive control unit 2a" is written as "MCU-2a".

Let's assume that, when the drive control unit 2a is driving and controlling the motor 3a through the relay 4aa and the drive control unit 2b is driving and controlling the motor 3b through the relay 4bb, a failure occurs (is detected), for example, in the drive control unit 2a ("No" in Step S10). Then, the drive control unit 2a is inactivated and the relay 4aa is made open, to thereby prevent erroneous power supply from the drive control unit 2a to the motor 3a (Steps S11 to S12).

Then, the stop-position information of the motor 3a separated off from the drive control unit 2a is acquired by the drive control unit 2b (Step S13), and whether the stop position of the motor 3a is proper or not is determined on the basis of the thus-acquired stop-position information (Step S14). If it is determined not to be proper ("No" in Step S14), the relay 4bb is made open while the relay 4ba is closed, thus making it possible to supply power from the drive control unit 2b to the motor 3a (Step S17). Then, the stop position is adjusted by the drive control unit 2b (Step S18) until the motor 3a gets a proper position ("Yes" in Step S14).

When, after passing through Step S18, the stop position is determined to be proper ("Yes" in Step S14), the relay 4ba is made open while the relay 4bb is closed, again (Step S15). Accordingly, the drive control unit 2b returns to the component serving to control the motor 3b, that is, its normal state (Step S16). In contrast, when, without passing through Step S18, the stop position is determined to be proper ("Yes" in Step S14), the flow moves to Step S16 while maintaining the open state of the relay 4ba and the closed state of the relay 4bb (Step S15). Namely, the drive control unit other than the drive control unit 2a is placed in a normal connection state.

It is noted that "END" is placed next to Step S16; however, thereafter, it is allowable that the position of the motor 3a is subjected to appropriate monitoring and, when the motor is displaced due to, for example, vibrations or the like, to an improper position, Steps S17 and S18 are executed. Further, in this example, a case has been described where a failure occurs in the drive control unit 2a; however, it is possible, of course, to deal similarly with a case where a failure occurs in the drive control unit 2b.

It is noted that the respective motor 3a and motor 3b, or the respective drive control unit 2a and drive control unit 2b, are not required to have the same specification and may also have different purposes, so long as they are mutually interchangeable with respect to the aforementioned adjustment in stop position. However, at the time of adjusting the stop position of the other motor 3, if it is necessary to adjust a drive signal that is otherwise used in the regular drive system line, a command for adjusting the drive signal according to the changed target may be outputted, for example, by the cooperative control unit 9.

According to the foregoing, although the driving of the motor 3b is suspended temporarily, the motor 3a will be stopped after adjustment of the stop position of the motor 3a to a proper position. Thus, it is possible to avoid a trouble due to the stop position from occurring in the system, and thereafter, it becomes possible to properly perform driving and controlling, when the drive control unit 2a is restored to the normal state. Namely, if the motor is stopped at an improper position because of occurrence of a failure in one drive control unit 2 out of the plurality of the drive control units 2 for individually driving the respective motors 3, the stop position is adjusted from another drive control unit 2. This avoids such an event that, for example, an electric brake system of a vehicle or the like is suspended in a braked state to thereby interfere with the control of the vehicle.

Namely, the relays 4 and the cooperative control unit 9 are constituted as a cooperative control mechanism which can adjust the position of the stopped motor 3 by using the drive control unit 2 in the motor system line that otherwise controls another motor 3 in an independent manner, without provision of a spare drive control unit. Thus, it is possible to decrease the number of the mounted drive control units, to thereby reduce enlargement of the configuration thereof. Said differently, the drive control units 2 are each not multiplied, but the connection path connecting between the system lines is established, to thereby allow the control unit 2 for controlling another motor 3 to serve a multiplexed function, temporarily. Thus, it is possible to stably control the servomotors, while reducing enlargement of the system.

Embodiment 2

Figure 3:
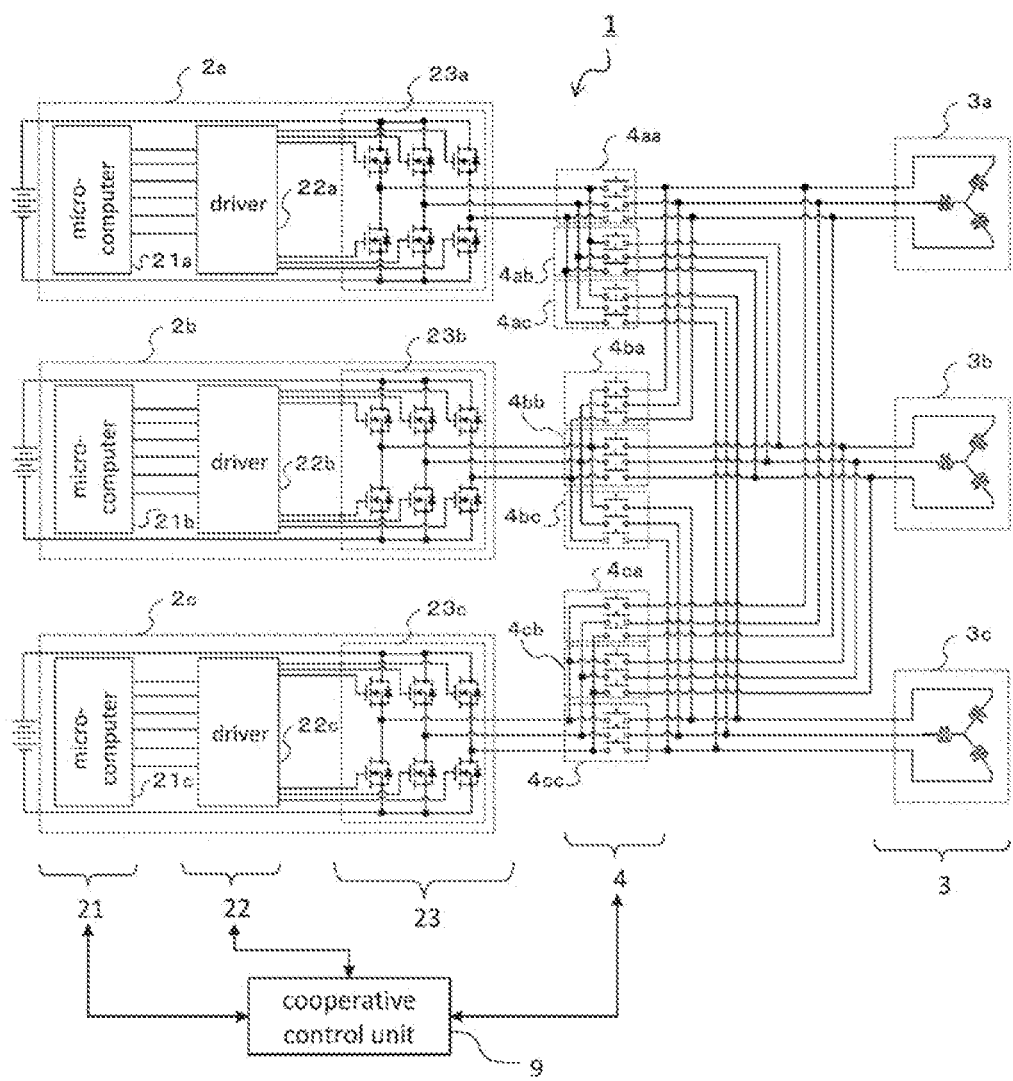
FIG. 3 is a block diagram for illustrating a configuration of a rotary electric machine control device according to Embodiment 2.
Figure 4:
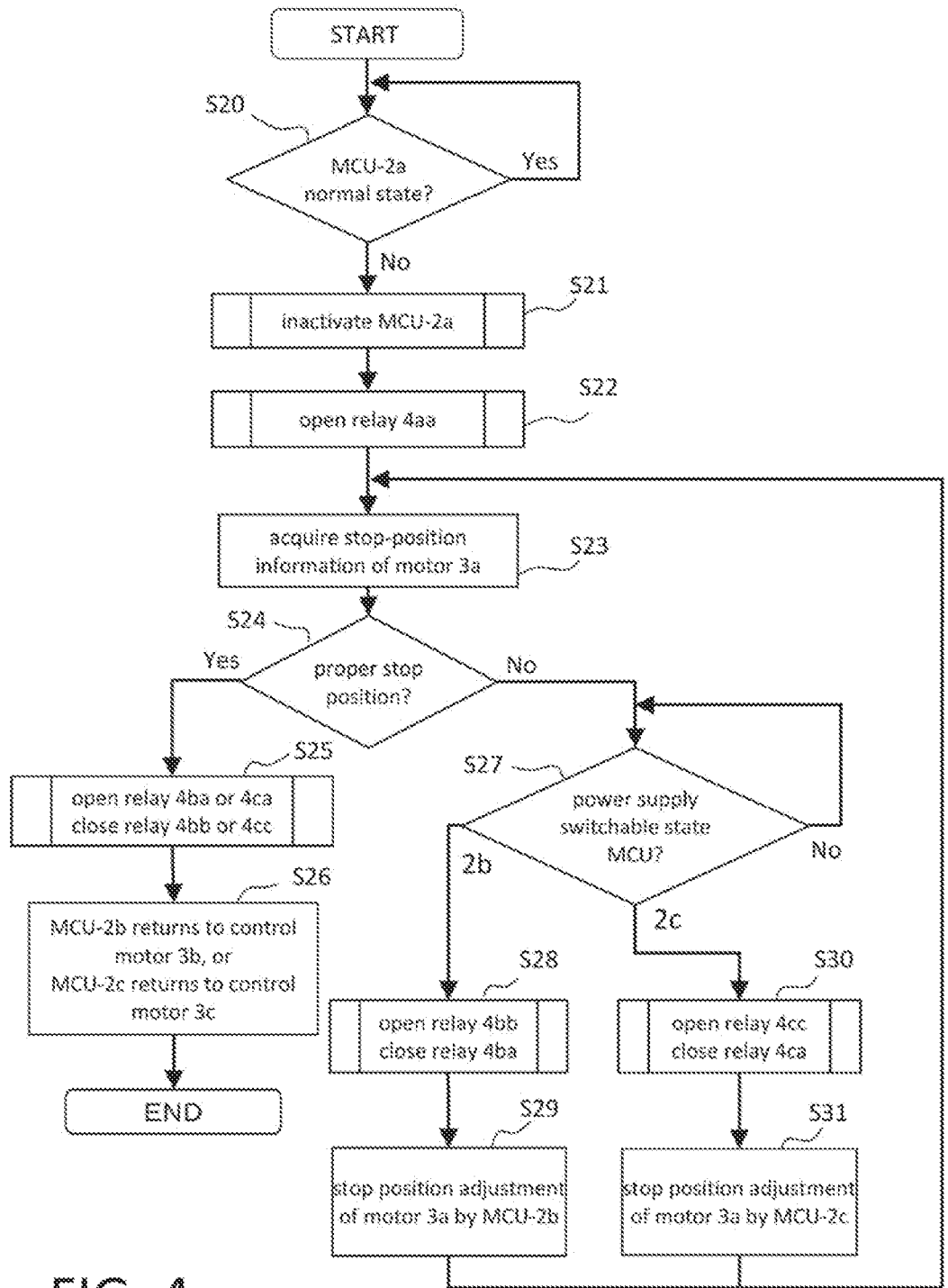
FIG. 4 is a flowchart for illustrating an operation example of the rotary electric machine control device according to Embodiment 2.

In Embodiment 1, a case has been described where two motor system lines are cooperated, whereas in Embodiment 2, a case will be described where three motor system lines are cooperated. FIG. 3 and FIG. 4 are provided for illustrating a configuration and operations of a rotary electric machine control device according to Embodiment 2, in which FIG. 3 is a block diagram for illustrating the configuration of the rotary electric machine control device, and FIG. 4 is a flowchart for illustrating the operations at the occurrence of a failure in one of drive control units in the rotary electric machine control device. Note that in FIG. 3, the parts with the same reference numerals as those in FIG. 1 described in Embodiment 1 indicate the same parts, so that description of overlapping parts will be omitted.

As shown in FIG. 3, in a rotary electric machine control device 1 according to Embodiment 2, a motor system line comprised of a drive control unit 2a, a motor system line comprised of a drive control unit 2b and a motor system line in which a motor 3c is driven and controlled by a drive control unit 2c, are formed. Further, the drive control units 2a, 2b, 2c in the respective motor system lines are connected through relays 4 to the motors 3a, 3b, 3c, respectively. Furthermore, the rotary electric machine control device 1 is configured to include a cooperative control unit 9 for controlling the drive control units 2 (or, microcomputers 21 and drivers 22 that constitute the respective units) and the relays 4 in the respective motor system lines, in a cooperative manner.

For example, the drive control unit 2a has a bridge circuit 23a for converting power from a DC power source with no reference symbol into AC power, a driver 22a for driving the bridge circuit 23a, and a microcomputer 21a for controlling operations of the driver 22a. In addition, it is configured to control the motor 3a as an AC servomotor, separately and independently of the drive control unit 2b and the drive control unit 2c. Likewise, the drive control unit 2b and the drive control unit 2c are respectively configured to control the motor 3b and the motor 3c, independently of the other drive control units.

Further, the AC power from the bridge circuit 23a of the drive control unit 2a is outputted through a normally-closed relay 4aa among the relays 4 to the motor 3a. Meanwhile, it is also designed to be capable of being outputted through a relay 4ab to the motor 3b, and through a relay 4ac to the motor 3c. Likewise, according to the drive control unit 2b, although the power is outputted through a normally-closed relay 4bb to the motor 3b, it is also designed to be capable of being outputted through a relay 4ba to the motor 3a, and through a relay 4bc to the motor 3c. Likewise, according to the drive control unit 2c, although the power is outputted through a normally-closed relay 4cc to the motor 3c, it is also designed to be capable of being outputted through a relay 4ca to the motor 3a, and through a relay 4cb to the motor 3b.

It is noted that, also in Embodiment 2, the respective motors 3a to 3c, or the respective drive control units 2a to 2c are not required to have the same specification and may also have different purposes, so long as they are mutually interchangeable with respect to the adjustment in stop position.

With respect to the rotary electric machine control device 1 thus provided with the drive control units 2a to 2c for independently driving the respective motors 3a to 3c, operations of the cooperative control unit 9 at the occurrence of a failure in one drive control unit 2a, will be described using the flowchart in FIG. 4 as a reference.

Let's assume that, when the drive control units 2a to 2c are driving and controlling the motors 3a to 3c, respectively, through relays 4 in normal states, a failure occurs, for example, in the drive control unit 2a ("No" in Step S20). Then, the drive control unit 2a is inactivated and the relay 4aa is made open, to thereby prevent erroneous power supply from the drive control unit 2a to the motor 3a (Steps S21 to S22).

Then, the stop-position information of the motor 3a separated off from the drive control unit 2a is acquired by the drive control unit 2b or 2c that is the drive control unit other than the drive control unit 2a (Step S23). Whether the stop position of the motor 3a is proper or not is determined on the basis of the thus-acquired stop-position information (Step S24). If it is determined not to be proper ("No" in Step 24), then, whether or not a drive control unit in a power-supply switchable state is present in the remaining drive control unit 2b and drive control unit 2c, is determined (Step S27).

When the drive control unit 2b is in a power-supply switchable state ("2b" in Step S27), the relay 4bb is made open while the relay 4ba is closed, thus making it possible to supply power from the drive control unit 2b to the motor 3a (Step S28). Then, the stop position of the motor 3a is adjusted by the drive control unit 2b (Step S29) and then the flow moves to Step S23.

Instead, when the drive control unit 2c is in a power-supply switchable state ("2c" in Step S27), the relay 4cc is made open while the relay 4ca is closed, thus making it possible to supply power from the drive control unit 2c to the motor 3a (Step S30). Then, the stop position of the motor 3a is adjusted by the drive control unit 2c (Step S31) and then the flow moves to Step S23.

It is noted that, in this example, priority between the drive control unit 2b and the drive control unit 2c is not particularly specified in Step S27, and thus, the flow is such that, when both of the drive control unit 2b and the drive control unit 2c are in the switchable state, either of them may be selected. Thus, for example, one of them from which a signal indicating the switchable state has come earlier than that of the other one, may be determined as the drive control unit subject to switching. Instead, where appropriate, priority between them may be set according to the important degrees or the usage frequencies of the respective control targets of the motor 3b and the motor 3c. On the other hand, when it is clear which one of them is subject to switching, for example, in the case where the drive control unit 2b is driving the motor 3b while the drive control unit 2c does not drive the motor 3c, it is appropriate to preferentially determine the drive control unit 2c to be subject to temporal multiplexing for the motor 3a.

When, after passing through Step S29 or Step S31, the stop position is determined to be proper ("Yes" in Step S24), the open-closed state of the relays changed in Step S28 or Step S30 is restored (Step S25). Accordingly, the drive control unit 2b or the drive control unit 2c whose drive control target has been switched in Step S28 or Step S30, returns to the component serving to control the motor 3b or the motor 3c, that is, its normal state (Step S26). In contrast, when, without passing through Step S29 or Step S31, the stop position is determined to be proper ("Yes" in Step S24), the flow moves to Step S26 while maintaining the state of the relays 4 (Step S25). Namely, the drive control units 2 other than the drive control unit 2a are each placed in a normal connection state.

It is noted that, also in Embodiment 2, "END" is placed next to Step S26; however, the flow may be allowed to move to Step S24 therefrom under appropriate monitoring of the position of the motor 3a. Further, in this example, a case has been described where a failure occurs in the drive control unit 2a; however, it is possible, of course, to deal similarly with a case where a failure occurs in the other drive control unit 2b or 2c. According to the foregoing, although the driving of the other motor 3 is suspended temporarily, the motor 3a will be stopped after adjustment of the stop position of the motor 3a to a proper position. Thus, it is possible to avoid a trouble due to the stop position from occurring in the system, and thereafter, it becomes possible to properly perform driving and controlling, when the drive control unit 2a is restored to the normal state.

Embodiment 3

Figure 5:
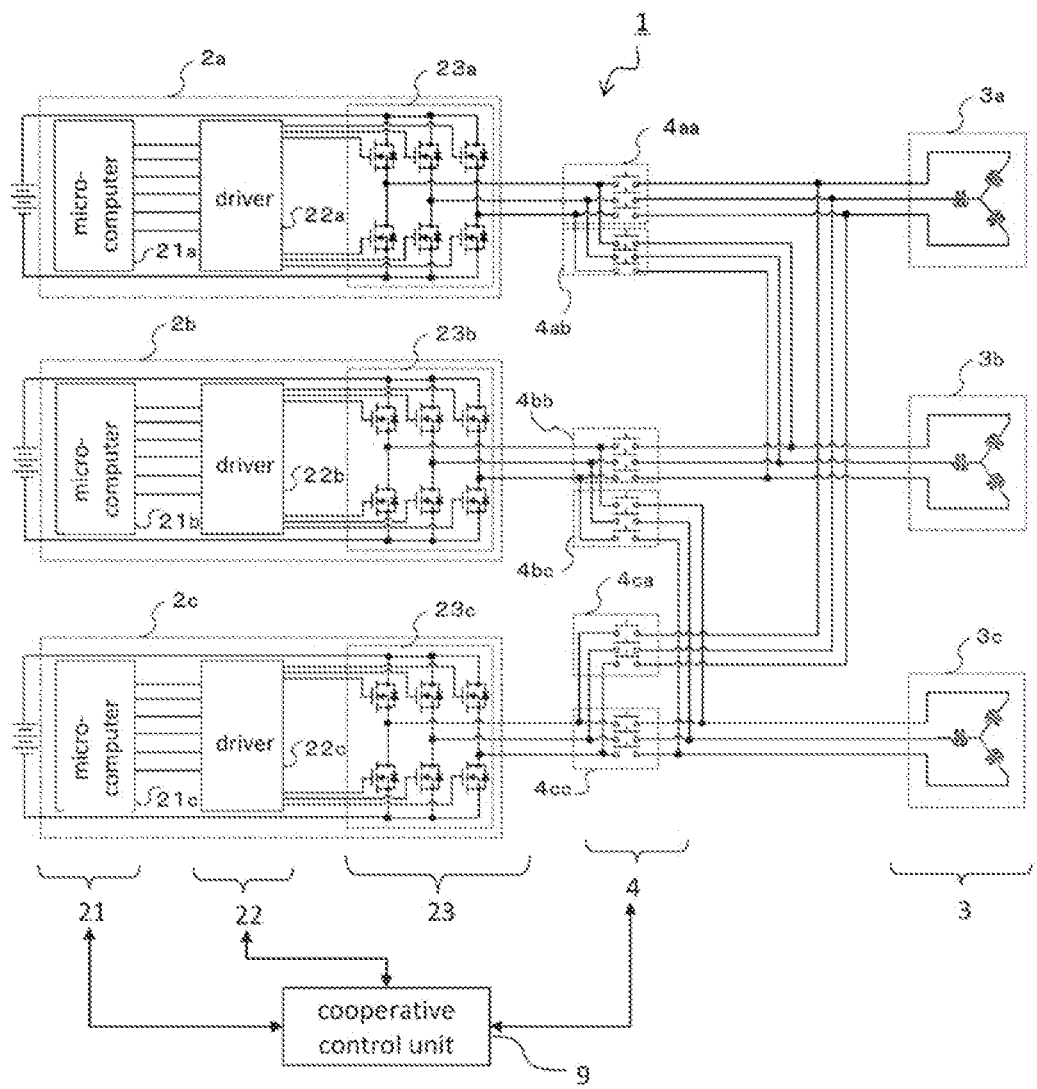
FIG. 5 is a block diagram for illustrating a configuration of a rotary electric machine control device according to Embodiment 3.
Figure 6:
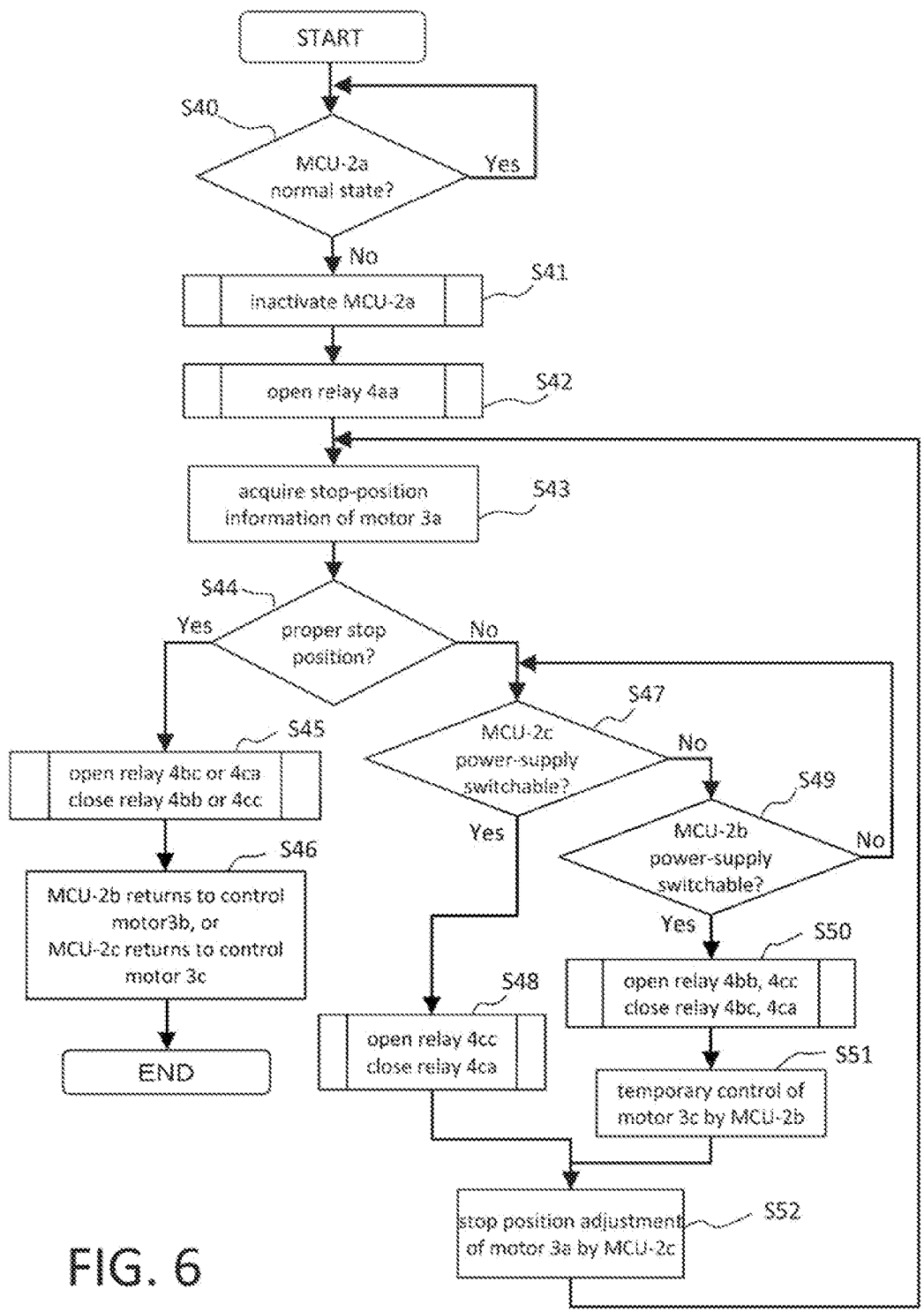
FIG. 6 is a flowchart for illustrating an operation example of the rotary electric machine control device according to Embodiment 3.

In Embodiment 2, a case has been described where each of the motors in the three motor system lines can be connected to either of the drive control units in the other remaining two motor system lines. In Embodiment 3, a case will be described where it is configured so that only one of the remaining motor system lines can be subject to such a simple connection through one relay. FIG. 5 and FIG. 6 are provided for illustrating a configuration and operations of a rotary electric machine control device according to Embodiment 3, in which FIG. 5 is a block diagram for illustrating the configuration of the rotary electric machine control device, and FIG. 6 is a flowchart for illustrating the operations at the occurrence of a failure in one of drive control units in the rotary electric machine control device. Note that in FIG. 5, the parts with the same reference numerals as those in FIG. 3 described in Embodiment 2 indicate the same parts, so that description of overlapping parts will be omitted.

As shown in FIG. 5, in a rotary electric machine control device 1 according to Embodiment 3, a motor system line comprised of a drive control unit 2a, a motor system line comprised of a drive control unit 2b and a motor system line comprised of a drive control unit 2c, are formed. Further, the drive control units 2a, 2b, 2c in the respective motor system lines are connected through relays 4 to motors 3a, 3b, 3c, respectively. Furthermore, the rotary electric machine control device is configured to include a cooperative control unit 9 for controlling the drive control units 2a, 2b, 2c (or, microcomputers 21 and drivers 22 that constitute the respective units) and the relays 4 in the respective motor system lines, in a cooperative manner.

Further, the AC power from a bridge circuit 23a of the drive control unit 2a is outputted through a normally-closed relay 4aa among the relays 4 to the motor 3a. Meanwhile, it is also designed to be capable of being outputted through a relay 4ab to the motor 3b. Likewise, according to the drive control unit 2b, although the power is outputted through a normally-closed relay 4bb to the motor 3b, it is also designed to be capable of being outputted through a relay 4bc to the motor 3c. Likewise, according to the drive control unit 2c, although the power is outputted through a normally-closed relay 4cc to the motor 3c, it is also designed to be capable of being outputted through a relay 4ca to the motor 3a.

Namely, what differs from Embodiment 2 is that, when viewed from each motor 3, the number of the drive control units 2 each connectable simply through the relay 4 to the motor is just two, including that for normal connection. Even so, as described below, it is possible at the occurrence of a failure of the drive control unit 2, to adjust the position of the motor 3 from the other drive control unit 2, and to make the number of relays and interconnections for constituting the relays 4 smaller than that in Embodiment 2. With respect to the rotary electric machine control device 1 provided with the drive control units 2a to 2c for independently driving the respective motors 3a to 3c, operations of the cooperative control unit 9 at the occurrence of a failure in one drive control unit 2a, will be described using the flowchart in FIG. 6 as a reference.

Let's assume that, when the drive control units 2a to 2c are driving and controlling the motors 3a to 3c, respectively, through relays 4 in normal states, a failure occurs, for example, in the drive control unit 2a ("No" in Step S40). Then, the drive control unit 2a is inactivated and the relay 4aa is made open, to thereby prevent erroneous power supply from the drive control unit 2a to the motor 3a (Steps S41 to S42).

Here, since position information can be acquired regardless of how the relays 4 are connected,
the stop-position information of the motor 3a separated off from the drive control unit 2a is acquired by the drive control unit 2b or 2c that is the drive control unit other than the drive control unit 2a (Step S43). Whether the stop position of the motor 3a is proper or not is determined on the basis of the thus-acquired stop-position information (Step S44). If it is determined not to be proper ("No" in Step 44), then, whether or not, out of the remaining drive control unit 2b and drive control unit 2c, the drive control unit 2c configured to be simply connectable to the motor 3 is in a power-supply switchable state, is determined (Step S47).

When the drive control unit 2c is in a power-supply switchable state ("Yes" in Step S47), the relay 4cc is made open while the relay 4ca is closed, thus making it possible to supply power from the drive control unit 2c to the motor 3a (Step S48). Then, the stop position of the motor 3a is adjusted by the drive control unit 2c (Step S52) and then the flow moves to Step S43.

On the other hand, when the drive control unit 2c is in a power-supply non-switchable state ("No" in Step S47), then, whether or not the drive control unit 2b is in a power-supply switchable state, is determined (Step S49). When the drive control unit 2c is in a power-supply non-switchable state and only the drive control unit 2b is in a power-supply switchable state ("Yes" in Step S49), the relay 4bb and the relay 4cc are made open while the relay 4bc and the relay 4ca are closed (Step S50).

This makes it possible to drive the motor 3c by the drive control unit 2b, and to supply power from the drive control unit 2c to the motor 3a. Namely, by establishing such a bypass path to thereby drive the motor 3c by the drive control unit 2b (Step S51), the drive control unit 2c is placed in the switchable state, so that the stop position of the motor 3a is adjusted by the drive control unit 2c (Step S52) and then the flow moves to Step S43.

It is noted that, when the drive control unit 2c is in a power-supply non-switchable state ("No" in Step S47) and the drive control unit 2b is also in a power-supply non-switchable state ("No" in Step S40), because the switching of the drive control unit 2c should be performed preferentially, the flow moves to Step S47.

When, after passing through Step S47, the stop position is determined to be proper ("Yes" in Step S44), the open-closed state of the relays changed in Step S48 or Step S50 is restored (Step S45). Accordingly, the drive control unit 2b or 2c whose drive control target has been switched in Step S48 or Step S50, returns to the component serving to control the motor 3b or 3c, that is, its normal state (Step S46). In contrast, when, without passing through Step S47, the stop position is determined to be proper ("Yes" in Step S44), the flow moves to Step S46 while maintaining the state of the relays 4 (Step S45). Namely, the drive control units other than the drive control unit 2a are each placed in a normal connection state.

It is noted that, also in Embodiment 3, "END" is placed next to Step S46; however, the flow may be allowed to move to Step S44 therefrom under appropriate monitoring of the position of the motor 3a. Further, in this example, a case has been described where a failure occurs in the drive control unit 2a; however, it is possible, of course, to deal similarly with a case where a failure occurs in the other drive control unit 2b or 2c. According to the foregoing, although the driving of the other motor 3 is suspended temporarily, the motor 3a will be stopped after adjustment of the stop position of the motor 3a to a proper position. Thus, it is possible to avoid a trouble due to the stop position from occurring in the system, and thereafter, it becomes possible to properly perform driving and controlling, when the drive control unit 2a is restored to the normal state.

Embodiment 4

Figure 7:
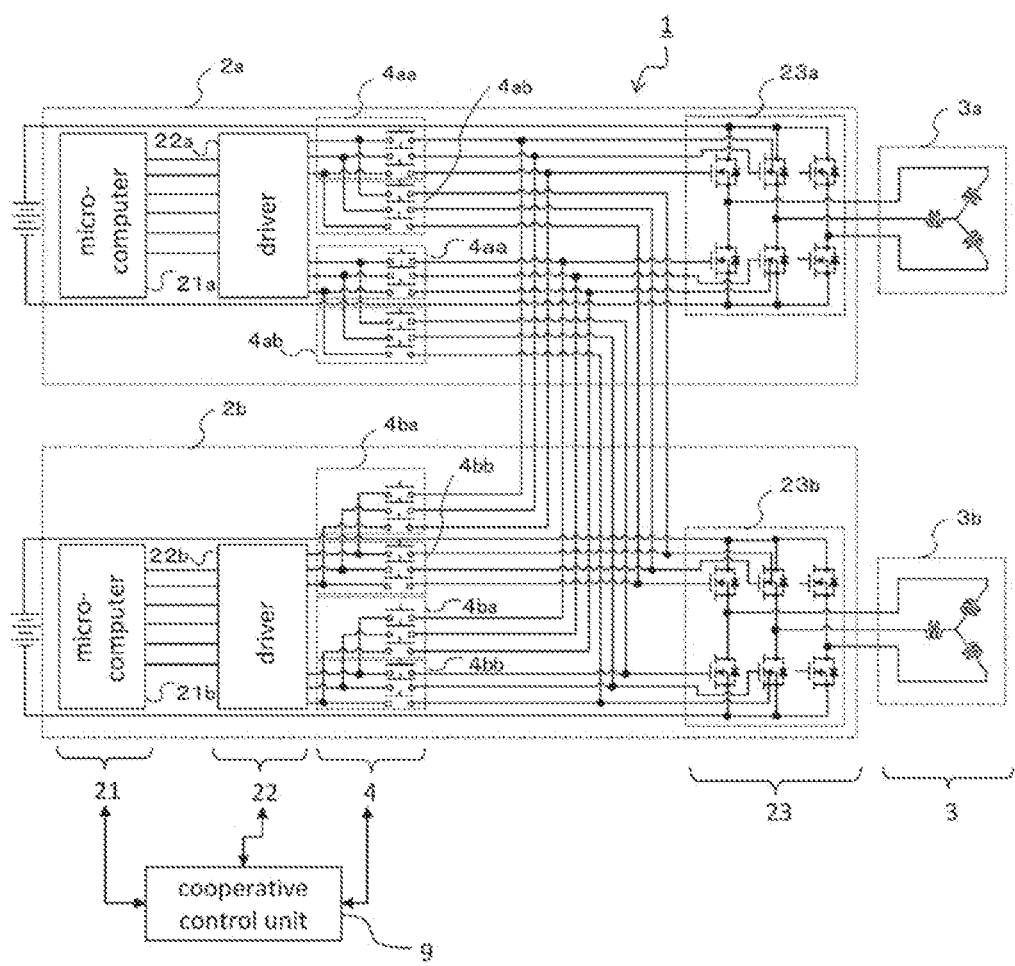
FIG. 7 is a block diagram for illustrating a configuration of a rotary electric machine control device according to Embodiment 4.
Figure 8:
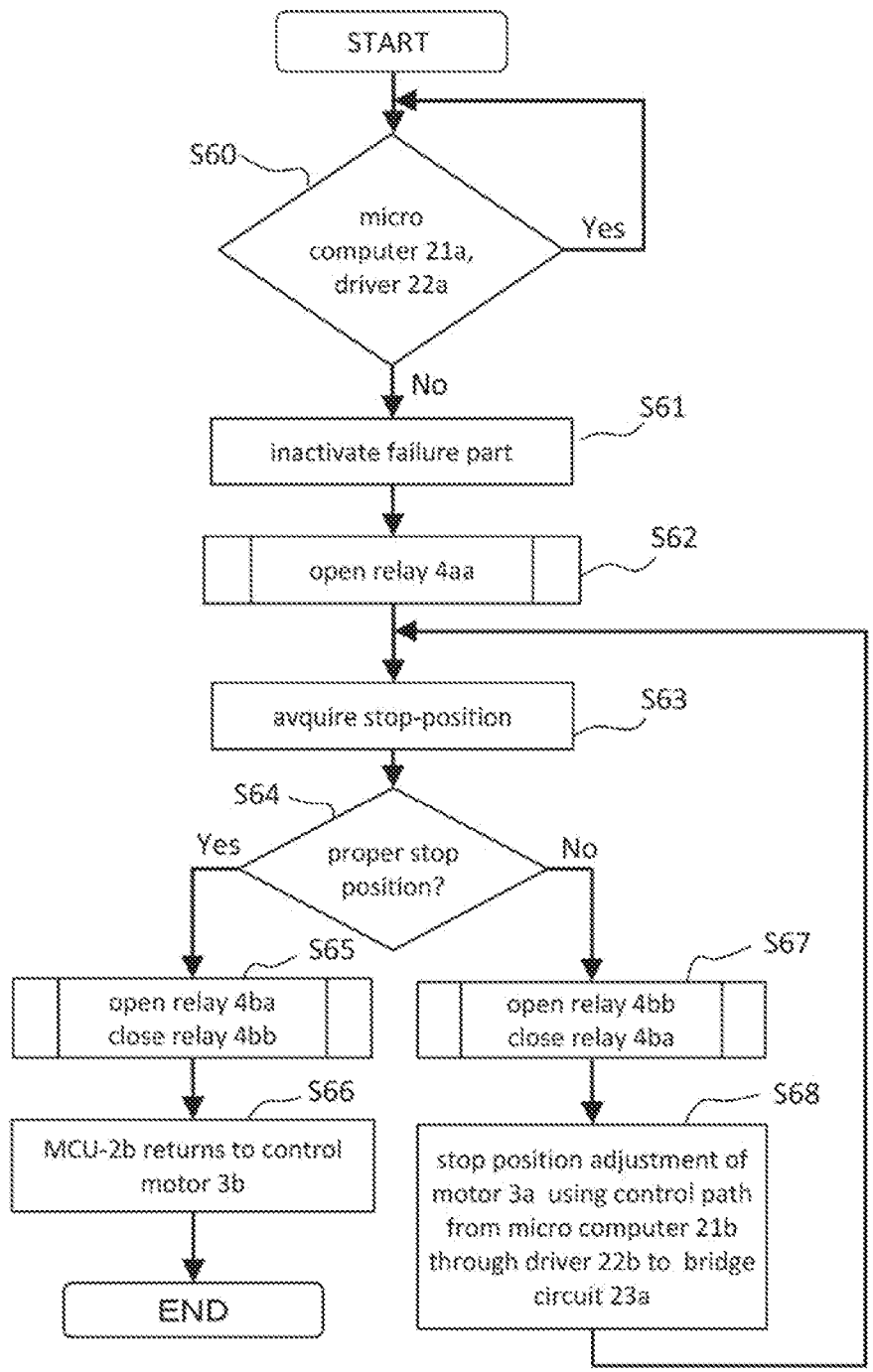
FIG. 8 is a flowchart for illustrating an operation example of the rotary electric machine control device according to Embodiment 4.

In Embodiments 1 to 3, cases have been described where the relays are located between the drive control units and the motors, whereas in Embodiment 4, a case will be described where the relays are located in the drive control units. FIG. 7 and FIG. 8 are provided for illustrating a configuration and operations of a rotary electric machine control device according to Embodiment 4, in which FIG. 7 is a block diagram for illustrating the configuration of the rotary electric machine control device, and FIG. 8 is a flowchart for illustrating the operations at the occurrence of a failure in one of drive control units in the rotary electric machine control device. Note that in FIG. 7, the parts with the same reference numerals as those in FIG. 1 described in Embodiment 1 indicate the same parts, except for the connected relations through the relays, so that description of overlapping parts will be omitted.

As shown in FIG. 7, in a rotary electric machine control device 1 according to Embodiment 4, a motor system line comprised of a drive control unit 2a, and a motor system line comprised of a drive control unit 2b, are formed. Further, a bridge circuit 23a of the drive control unit 2a and a bridge circuit 23b of the drive control unit 2b are directly connected to a motor 3a and a motor 3b, respectively. Meanwhile, in the drive control units 2a, 2b, microcomputers 21 and drivers 22 are directly connected to each other; however, drivers 22a, 22b are connected through internal relays 4 to the bridge circuit 23a and the bridge circuit 23b, respectively. Further, the rotary electric machine control device is configured to include a cooperative control unit 9 for controlling the microcomputers 21, the drivers 22 and the relays 4, in a cooperative manner.

For example, the drive control unit 2a has the bridge circuit 23a for converting power from a DC power source with no reference symbol into AC power, the driver 22a for driving the bridge circuit 23a, and a microcomputer 21a for controlling operations of the driver 22a. In addition, it is configured to control the motor 3a as an AC servomotor, separately and independently of the drive control unit 2b. Likewise, the drive control unit 2b is configured to control the motor 3b, independently of the drive control unit 2a.

Further, a drive signal from the driver 22a of the drive control unit 2a is outputted through a normally-closed relay 4aa among the relays 4 to the bridge circuit 23a. Meanwhile, it is also designed to be capable of being outputted through a relay 4ab to the bridge circuit 23b of the driver control unit 2b. Likewise, the drive signal from a driver 22b of the drive control unit 2b is outputted through a normally-closed relay 4bb among the relays 4 to the bridge circuit 23b. Meanwhile, it is also designed to be capable of being outputted through a relay 4ba to the bridge circuit 23a of the driver control unit 2a.

It is noted that, in Embodiment 4, the respective motors 3a, 3b, or the respective drive control units 2a, 2b, are not required to have the same specification and may also have different purposes, so long as their drivers 22 are mutually interchangeable with respect to the bridge circuits 23. Further, at the time of adjusting the stop position of the other motor 3, if it is necessary to adjust the drive signal, a command for adjusting the drive signal according to the changed target may be outputted, for example, by the cooperative control unit 9.

With respect to the rotary electric machine control device 1 thus provided with the drive control units 2a, 2b for independently driving the respective motors 3a, 3b, operations of the cooperative control unit 9 at the occurrence of a failure in one drive control unit 2a, will be described using the flowchart in FIG. 8 as a reference.

Let's assume that the drive control units 2a, 2b are driving the motors 3a, 3b, respectively, through relays 4 in normal states and by way of paths from the driver 22a to the bridge circuit 23a and from the driver 22b to the bridge circuit 23b. At that time, it is assumed that a failure occurs in either of the microcomputer 21a and the driver 22a in the drive control unit 2a ("No" in Step S60). Then, the part where the failure has occurred is inactivated and the relay 4aa is made open, to thereby prevent erroneous power supply from the microcomputer 21a and the driver 22a to the motor 3a (Steps S61 to S62).

Then, the stop-position information of the motor 3a separated off from the microcomputer 21a and the driver 22a is acquired by the drive control unit 2b (Step S63), and whether the stop position of the motor 3a is proper or not is determined on the basis of the thus-acquired stop-position information (Step S64). If it is determined not to be proper ("No" in Step 64), the relay 4bb is made open while the relay 4ba is closed, thus making it possible for the microcomputer 21b and the driver 22b to control the bridge circuit 23a (Step S67). Then, using the control path from the microcomputer 21b through the driver 22b to the bridge circuit 23a, the stop position is adjusted (Step S68) until the motor 3a gets a proper position ("Yes" in Step S64).

When, after passing through Step S67, the stop position is determined to be proper ("Yes" in Step S64), the relay 4ba is made open while the relay 4bb is closed, again (Step S65). Accordingly, the drive control unit 2b returns to the component serving to control the motor 3b, that is, its normal state (Step S66). In contrast, when, without passing through Step S67, the stop position is determined to be proper ("Yes" in Step S64), the flow moves to Step S66 while maintaining the open state of the relay 4ba and the closed state of the relay 4bb (Step S65). Namely, the drive control unit other than the drive control unit 2a is placed in a normal connection state.

It is noted that, also in Embodiment 4, "END" is placed next to Step S66; however, the flow may be allowed to move to Step S64 therefrom under appropriate monitoring of the position of the motor 3a. Further, in this example, a case has been described where a failure occurs in the microcomputer 21a or the driver 22a in the drive control unit 2a; however, it is possible, of course, to deal similarly with a case where a failure occurs in the drive control unit 2b. According to the foregoing, although the driving of the motor 3b is suspended temporarily, the motor 3a will be stopped after adjustment of the stop position of the motor 3a to a proper position. Thus, it is possible to avoid a trouble due to the stop position from occurring in the system, and thereafter, it becomes possible to properly perform driving and controlling, when the drive control unit 2a is restored to the normal state.

In this manner, even when the relays 4 are located between the drivers 22 and the bridge circuits 23, the relays 4 and the cooperative control unit 9 function as a cooperative control mechanism for establishing the connection path, described in each of Embodiments 1 to 3. Thus, the position of the stopped motor 3 is adjusted using the drive control unit 2 that otherwise controls another motor 3, without provision of a spare drive control unit, so that the number of the mounted drive control units 2 is not increased and thus it is possible to reduce enlargement of the configuration. Said differently, the drive control unit 2 is not multiplied for one motor 3 but the drive control unit 2 for controlling another motor 3 is temporarily caused to serve a multiplexed function. Thus, it is possible to stably control the servomotors, while reducing enlargement of the system.

Furthermore, the relay 4 requires just a smaller amount of current flowing therethrough than that flowing through the interconnection used to drive the motor as in each of Embodiments 1 to 3. For example, in the case of a system in which a large amount of current is required for the motor 3, it is necessary to increase the rated temperature and the rated current while taking a loss that will occur in the relay 4 into consideration, and this may result in enlargement of the system. However, according to the configuration as in Embodiment 4 in which the connection path is established so that the drive signal in the drive control unit 2 is switched using the relay 4, it is possible to reduce the necessity of taking the loss that will occur in the relay 4 into consideration, and thus the configuration shown in FIG. 7 can be realized compactly.

Embodiment 5

Figure 9:
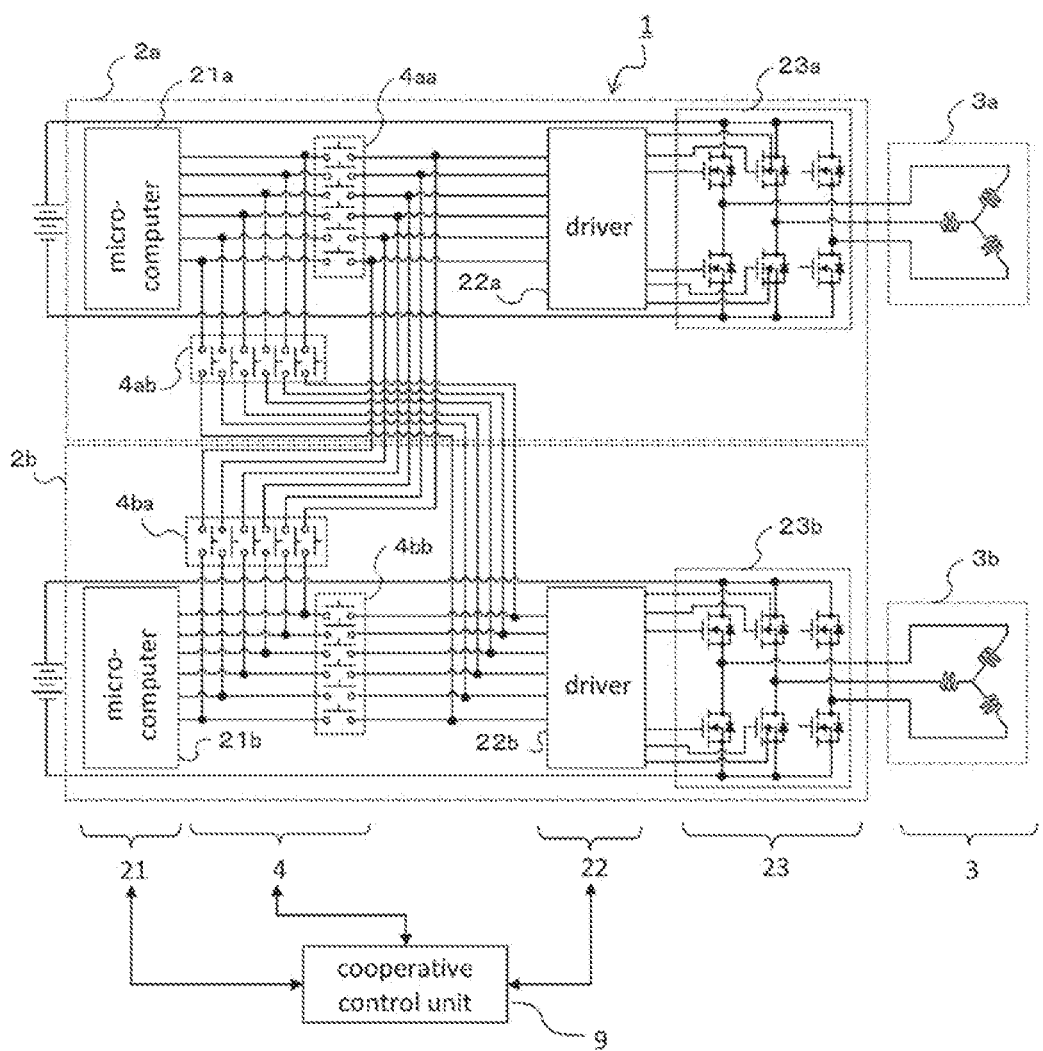
FIG. 9 is a block diagram for illustrating a configuration of a rotary electric machine control device according to Embodiment 5.
Figure 10:
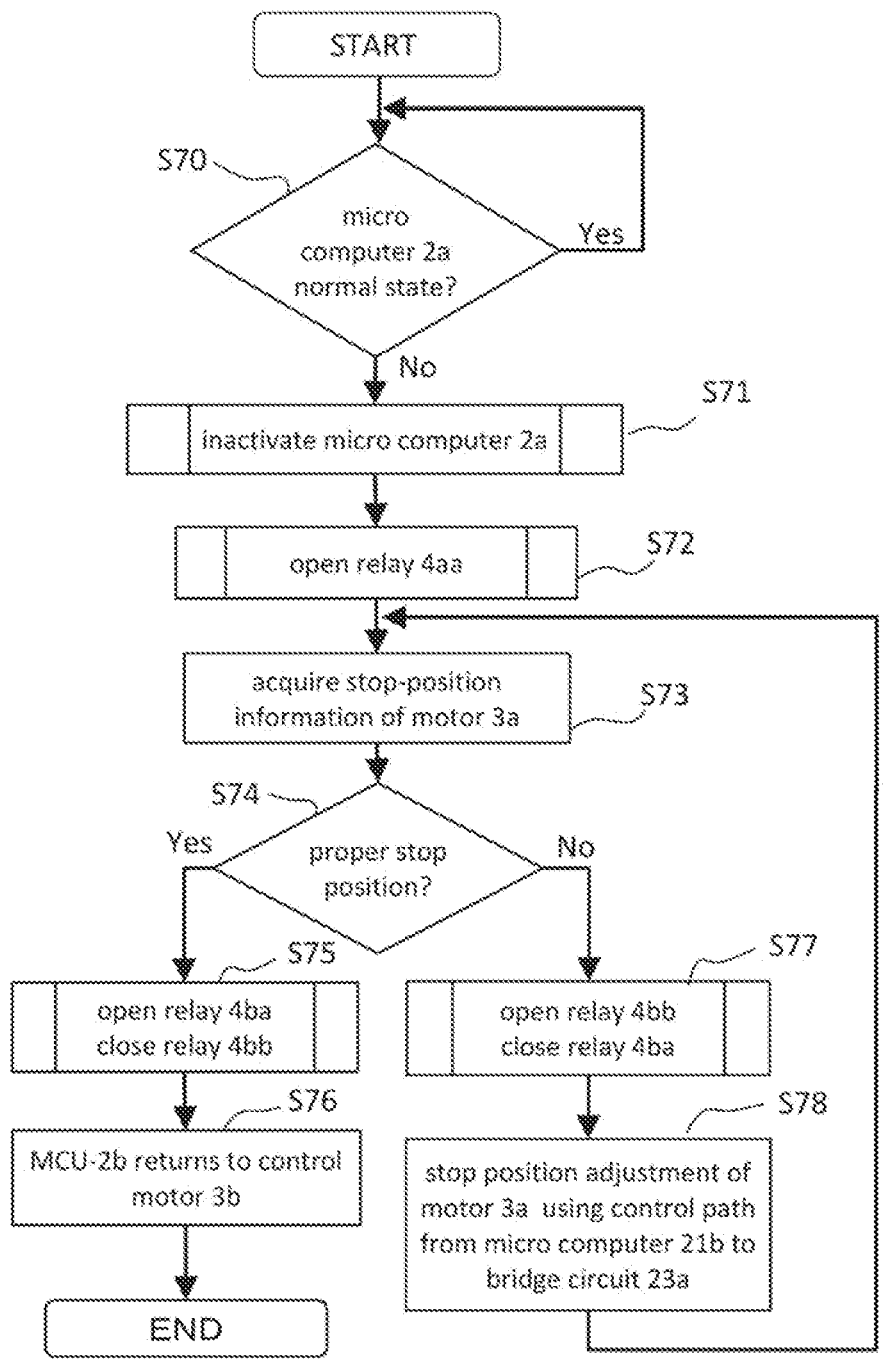
FIG. 10 is a flowchart for illustrating an operation example of the rotary electric machine control device according to Embodiment 5.

In Embodiment 4, a case has been described where the relays are located between the drivers and the bridge circuits in the drive control units, whereas in Embodiment 5, a case will be described where the relays are located between the microcomputers and the drivers. FIG. 9 and FIG. 10 are provided for illustrating a configuration and operations of a rotary electric machine control device according to Embodiment 5, in which FIG. 9 is a block diagram for illustrating the configuration of the rotary electric machine control device, and FIG. 10 is a flowchart for illustrating the operations at the occurrence of a failure in one of drive control units in the rotary electric machine control device. Note that in FIG. 9, the parts with the same reference numerals as those in FIG. 7 described in Embodiment 4 indicate the same parts, except for connected relations through the relays, so that description of overlapping parts will be omitted.

As shown in FIG. 9, in a rotary electric machine control device 1 according to Embodiment 5, a motor system line comprised of a drive control unit 2a, and a motor system line comprised of a drive control unit 2b, are formed. Further, a bridge circuit 23a of the drive control unit 2a and a bridge circuit 23b of the drive control unit 2b are directly connected to a motor 3a and a motor 3b, respectively. Meanwhile, in the drive control units 2a, 2b, the bridge circuits 23a, 23b are directly connected to respective drivers 22; however, microcomputers 21 and the drivers 22 are connected through internal relays 4 to each other. Further, the rotary electric machine control device is configured to include a cooperative control unit 9 for controlling the microcomputers 21, the drivers 22 and the relays 4, in a cooperative manner.

For example, the drive control unit 2a has the bridge circuit 23a for converting power from a DC power source with no reference symbol into AC power, a driver 22a for driving the bridge circuit 23a, and a microcomputer 21a for controlling operations of the driver 22a. In addition, it is configured to control the motor 3a as an AC servomotor, separately and independently of the drive control unit 2b. Likewise, the drive control unit 2b is configured to control the motor 3b, independently of the drive control unit 2a.

Further, a command from the microcomputer 21a of the drive control unit 2a is outputted through a normally-closed relay 4aa among the relays 4 to the driver 22a. Meanwhile, it is also designed to be capable of being outputted through a relay 4ab to a driver 22b of the driver control unit 2b. Likewise, a command from a microcomputer 21b of the drive control unit 2b is outputted through a normally-closed relay 4bb among the relays 4 to the driver 22b. Meanwhile, it is also designed to be capable of being outputted through a relay 4ba to the driver 22a of the driver control unit 2a.

It is noted that, in Embodiment 5, the respective motors 3a, 3b, or the respective drive control units 2a, 2b, are not required to have the same specification and may also have different purposes, so long as there is interchangeability between the microcomputers 21 and the drivers 22. Further, at the time of adjusting the stop position of the other motor 3, if it is necessary to adjust the drive signal, a command for adjusting the drive signal according to the changed target may be outputted, for example, by the cooperative control unit 9.

With respect to the rotary electric machine control device 1 thus provided with the drive control units 2a, 2b for independently driving the respective motors 3a, 3b, operations of the cooperative control unit 9 at the occurrence of a failure in one drive control unit 2a, will be described using the flowchart in FIG. 10 as a reference.

Let's assume that the drive control units 2a, 2b are executing operations of driving the motor 3a by using the bridge circuit 23a and driving the motor 3b by using the bridge circuit 23b, respectively, through relays 4 in normal states and by way of paths from the microcomputer 21a to the driver 22a and from the microcomputer 21b to the driver 22*b*. At that time, if a failure occurs, for example, in the microcomputer 21*a* in the drive control unit 2*a*, the microcomputer 21*a* is inactivated and the relay 4*aa* is made open, to thereby prevent erroneous power supply according to a command of the microcomputer 21*a*, to the motor 3*a* (Steps S71 to S72).

Then, the stop-position information of the motor 3*a* separated off from the microcomputer 21*a* is acquired by the drive control unit 2*b* (Step S73), and whether the stop position of the motor 3*a* is proper or not is determined on the basis of the thus-acquired stop-position information (Step S74). If it is determined not to be proper ("No" in Step 74), the relay 4*bb* is made open while the relay 4*ba* is closed, thus making it possible for the bridge circuit 23*a* to be controlled by the operation of the driver 22*a* controlled by the microcomputer 21*b* (Step S77). Then, using the control path from the microcomputer 21*b* through the driver 22*a* to the bridge circuit 23*a*, the stop position is adjusted (Step S78) until the motor 3*a* gets a proper position ("Yes" in Step S74).

When, after passing through Step S77, the stop position is determined to be proper ("Yes" in Step S74), the relay 4*ba* is made open while the relay 4*bb* is closed, again (Step S75). Accordingly, the drive control unit 2*b* returns to the component serving to control the motor 3*b*, that is, its normal state (Step S76). In contrast, when, without passing through Step S77, the stop position is determined to be proper ("Yes" in Step S74), the flow moves to Step S76 while maintaining the open state of the relay 4*ba* and the closed state of the relay 4*bb* (Step S75). Namely, the drive control unit other than the drive control unit 2*a* is placed in a normal connection state.

It is noted that, also in Embodiment 5, "END" is placed next to Step S76; however, the flow may be allowed to move to Step S74 therefrom under appropriate monitoring of the position of the motor 3*a*. Further, in this example, a case has been described where a failure occurs in the microcomputer 21*a* in the drive control unit 2*a*; however, it is possible, of course, to deal similarly with a case where a failure occurs in the drive control unit 2*b*. According to the foregoing, although the driving of the motor 3*b* is suspended temporarily, the motor 3*a* will be stopped after adjustment of the stop position of the motor 3*a* to a proper position. Thus, it is possible to avoid a trouble due to the stop position from occurring in the system, and thereafter, it becomes possible to properly perform driving and controlling, when the microcomputer 21*a* in the drive control unit 2*a* is restored to the normal state.

In this manner, even when the relays 4 are located between the microcomputers 21 and the drivers 22, the position of the stopped motor 3 can be adjusted, like in Embodiment 4, using the drive control unit 2 that otherwise controls another motor 3, without provision of a spare drive control unit. Furthermore, because the relays 4 are not located on the output side of the drivers 22 but on the input side thereof, the following effect is achieved.

The bridge circuit 23 in the drive control unit 2 is provided with MOSFET (metal-oxide-semiconductor field-effect transistor) or like switching elements. In order to prevent external noise interference and control delay due to the resistance of an interconnection on the printed-circuit board, it is frequently required that the gate for controlling "ON/OFF" of the switching element be provided with a short interconnection. When the relay 4 is located on the output side of the driver 22, namely, on its side toward the gate, the interconnection necessarily becomes longer, so that the aforementioned risk is increased. In contrast, when the interconnection between the driver 22 and the bridge circuit 23 becomes shorter as in Embodiment 5, the aforementioned risk is decreased, so that a highly reliable system can be configured compactly.

Embodiment 6

Figure 11:
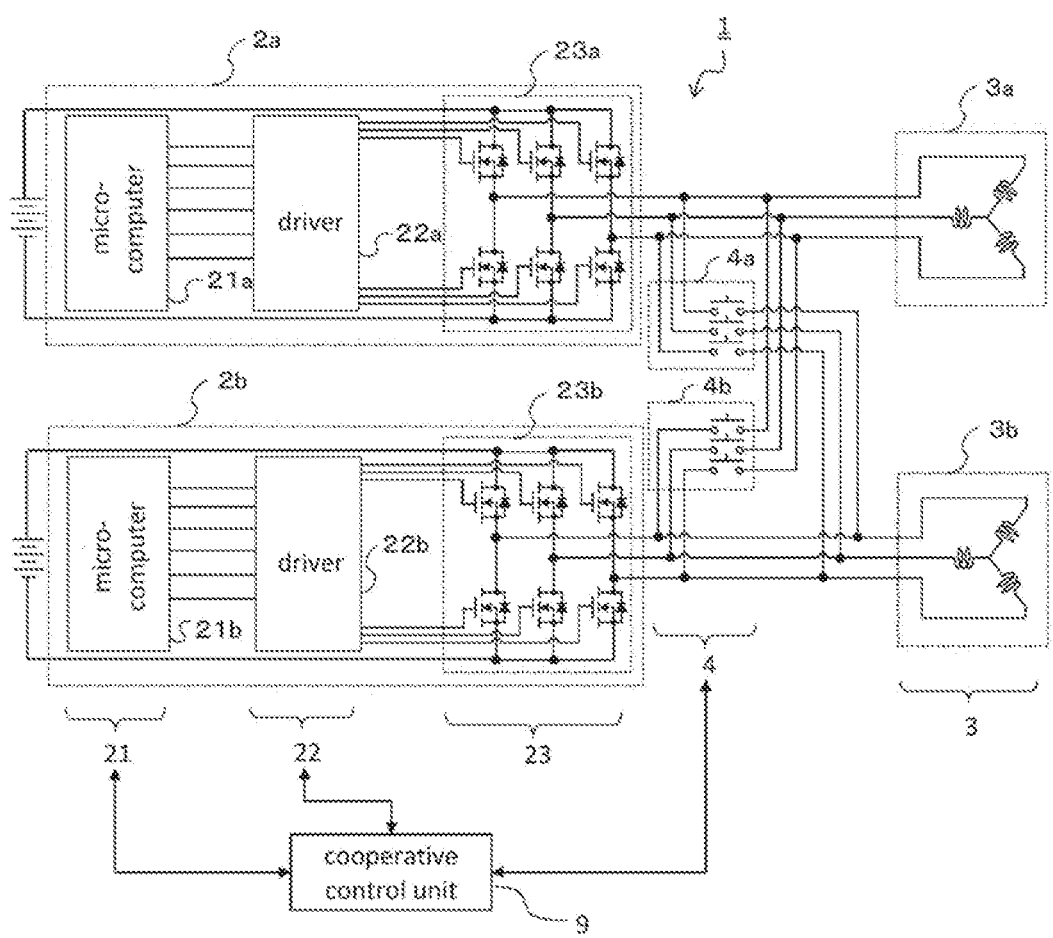
FIG. 11 is a block diagram for illustrating a configuration of a rotary electric machine control device according to Embodiment 6.
Figure 12:
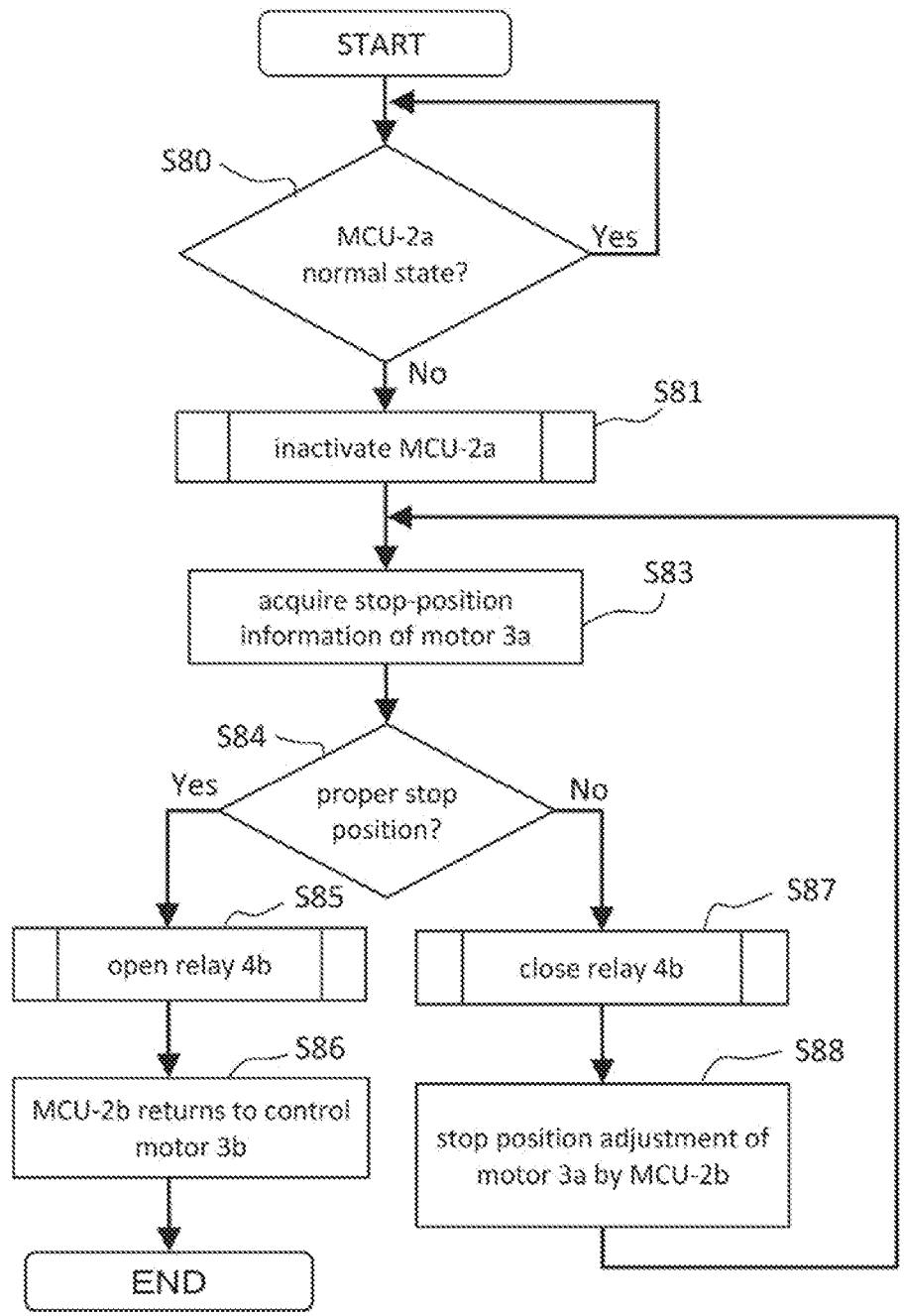
FIG. 12 is a flowchart for illustrating an operation example of the rotary electric machine control device according to Embodiment 6.

In Embodiments 1 to 3, cases have been described where, in order to separate off the drive control unit where a failure has occurred from the motor, a relay is connected in a system line portion that is normally connected to that motor, whereas in Embodiment 6, a case will be described where such a normally connected portion is instead provided by direct connection. FIG. 11 and FIG. 12 are provided for illustrating a configuration and operations of a rotary electric machine control device according to Embodiment 6, in which FIG. 1*l* is a block diagram for illustrating the configuration of the rotary electric machine control device, and FIG. 12 is a flowchart for illustrating the operations at the occurrence of a failure in one of drive control units in the rotary electric machine control device. Note that in FIG. 1*l*, except for the relays, the parts with the same reference numerals as those in FIG. 1 described in Embodiment 1 indicate the same parts, so that description of overlapping parts will be omitted.

As shown in FIG. 1*l*, in a rotary electric machine control device 1 according to Embodiment 6, a motor system line comprised of a drive control unit 2*a*, and a motor system line comprised of a drive control unit 2*b*, are formed. Further, a bridge circuit 23*a* of the drive control unit 2*a* and a bridge circuit 23*b* of the drive control unit 2*b* are directly connected to a motor 3*a* and a motor 3*b*, respectively. Meanwhile, the bridge circuit 23*a* of the drive control unit 2*a* is configured to be capable of being connected through a relay 4*a* among relays 4 to the motor 3*b*. Likewise, the bridge circuit 23*b* of the drive control unit 2*b* is configured to be capable of being connected through a relay 4*b* among the relays 4 to the motor 3*a*. Further, the rotary electric machine control device is configured to include a cooperative control unit 9 for controlling micro-computers 21, drivers 22 and the relays 4, in a cooperative manner.

According to Embodiments 1 to 3, it is configured so that, at the occurrence of a failure in the drive control unit 2, AC power from the drive control unit 2 where the failure has occurred is shut off, to thereby suspend power supply to the motor 3. However, when power supply to the motor 3 is designed to be suspended, at the occurrence of a failure, by inactivating the drive control unit 2 where the failure has occurred, the power supply from the drive control unit 2 where the failure has occurred is never continued even without interrupting the connection by use of the relay 4. Accordingly, for the purpose of adjusting the motor position, it suffices that AC power to the target motor 3 is provided from another drive control unit 2 than the drive control unit 2 where the failure has occurred, and thus, in Embodiment 6, the relays 4 are provided as described above.

It is noted, however, that, according to this configuration, as will be described later, when the relay 4*a* or 4*b* is closed, the motor 3*a* and the motor 3*b* fall in a mutually connected state, and thus, the configuration is limited for use in a system that is designed so that the motor 3 can be rotated even in such a connected state.

With respect to the rotary electric machine control device 1 thus provided with the drive control units 2*a*, 2*b* for independently driving the respective motors 3*a*, 3*b*, operations of the cooperative control unit 9 at the occurrence of a failure in one drive control unit 2*a*, will be described using the flowchart in FIG. 12 as a reference.

Let's assume that, when the drive control units 2a, 2b are driving and controlling the motors 3a, 3b, respectively, without through the relays 4, a failure occurs, for example, in the drive control unit 2a ("No" in Step S80). Then, the drive control unit 2a where the failure has occurred is inactivated, to thereby prevent erroneous power supply to the motor 3a (Step S81).

Then, the stop-position information of the motor 3a to which power supply from the drive control unit 2a is suspended, is acquired by the drive control unit 2b (Step S83), and whether the stop position of the motor 3a is proper or not is determined on the basis of the thus-acquired stop-position information (Step S84). If it is determined not to be proper ("No" in Step S84), the relay 4b is closed, thus making it possible for the drive control unit 2b to drive the motor 3a (Step S87). Then, the stop position is adjusted by the drive control unit 2b (Step S88) until the motor 3a gets a proper position ("Yes" in Step S84).

When, after passing through Step S87, the stop position is determined to be proper ("Yes" in Step S84), the relay 4b is made open again (Step S85). Accordingly, the drive control unit 2b returns to the component serving to control the motor 3b, only, that is, its normal state (Step S86). In contrast, when, without passing through Step S87, the stop position is determined to be proper ("Yes" in Step S84), the flow moves to Step S86 while maintaining the open state of the relay 4b (Step S85). Namely, the drive control unit 2b is placed in a normal connection state.

It is noted that, also in Embodiment 6, "END" is placed next to Step S86; however, the flow may be allowed to move to Step S84 therefrom under appropriate monitoring of the position of the motor 3a. Further, in this example, a case has been described where a failure occurs in the drive control unit 2a; however, it is possible, of course, to deal similarly with a case where a failure occurs in the drive control unit 2b. According to the foregoing, although the driving of the motor 3b is suspended temporarily, the motor 3a will be stopped after adjustment of the stop position of the motor 3a to a proper position. Thus, it is possible to avoid a trouble due to the stop position from occurring in the system, and thereafter, it becomes possible to properly perform driving and controlling, when the drive control unit 2a is restored to the normal state.

In this manner, the AC output line in the normal motor system line is provided by direct connection without through the relay 4, so that, unlike a relay to be used in the normal motor system line, the specification of the relay 4 to be used only for adjusting the rotational position can be determined without taking its continuous operation time into consideration. Accordingly, it is possible not only to reduce the number of the relays, but also to allow the relay for use to have a smaller specification than the rated specification, and thus the configuration can be provided more compactly.

Embodiment 7

Figure 13:
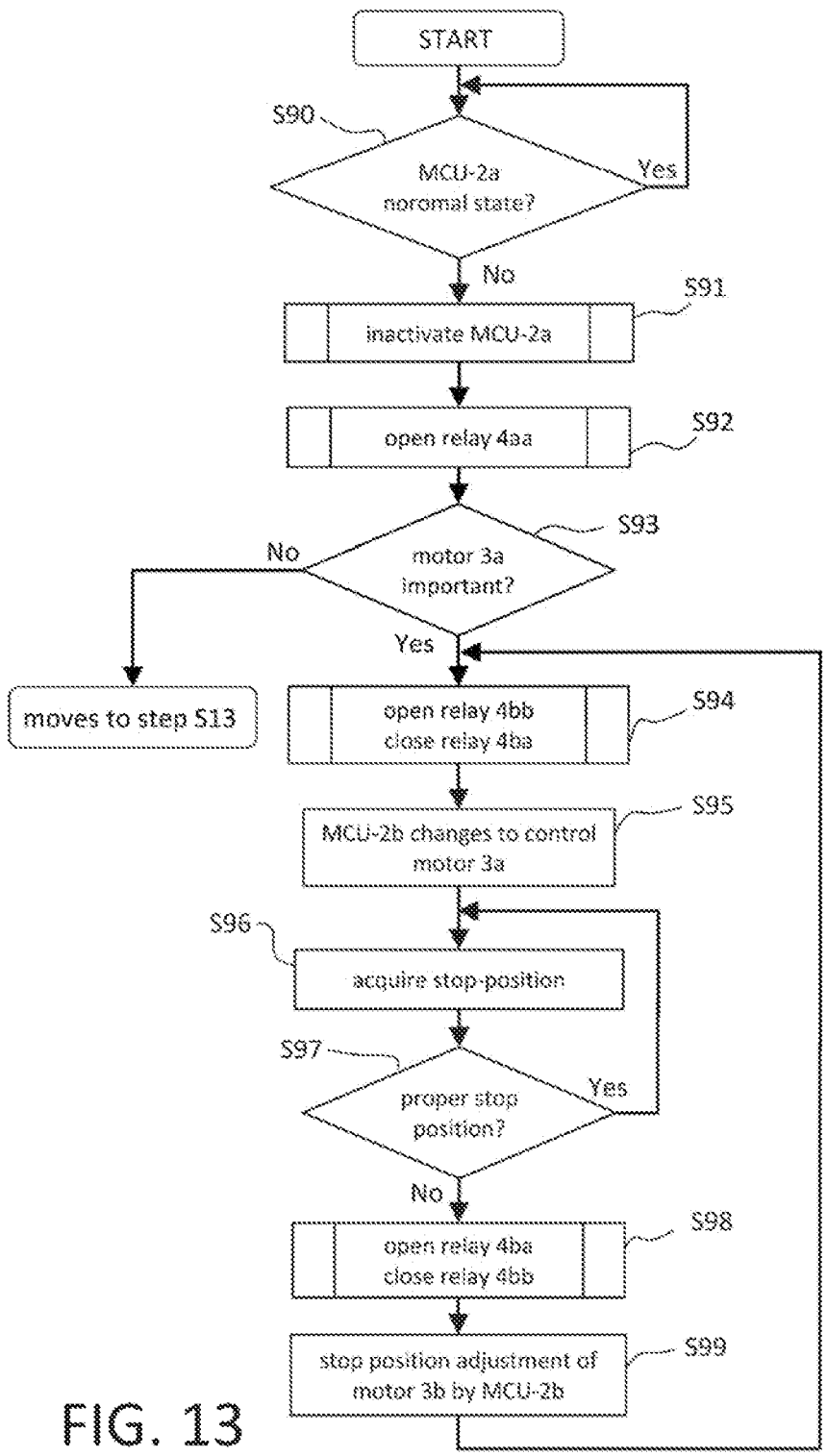
FIG. 13 is a flowchart for illustrating an operation example of a rotary electric machine control device according to Embodiment 7.

In Embodiments 1 to 6, cases have been described where, when a failure occurs in the drive control unit, the motor in a drive system, etc. of that drive control unit will be stopped after adjustment of the stop position. In Embodiment 7, a case will be described where the motor in the motor system line corresponding to the drive control unit where a failure has occurred, is then driven and controlled instead by a drive control unit in another drive system, etc. FIG. 13 is a flowchart for illustrating operations of a rotary electric machine control device according to Embodiment 7. Note that, with respect to its configuration, FIG. 1 described in Embodiment 1 is also employed here, so that description of overlapping parts will be omitted.

With respect to a rotary electric machine control device 1 which is similar to that of Embodiment 1 provided with the drive control units 2a, 2b for independently driving the respective motors 3a, 3b, it is assumed that how to control the motor 3a to be controlled by the drive control unit 2a is important in a system. Under that assumption, operations of the cooperative control unit 9 at the occurrence of a failure in the drive control unit 2a for driving the motor 3a, will be described using the flowchart in FIG. 13 as a reference.

Let's assume that, when the drive control units 2a, 2b are driving and controlling the motors 3a, 3b, respectively, through the relays 4 in normal states, a failure occurs in the drive control unit 2a ("No" in Step S90). Then, the drive control unit 2a where the failure has occurred is inactivated and the relay 4aa is made open, to thereby prevent erroneous power supply from the drive control unit 2a to the motor 3a (Steps S91 to S92). At that time, the important degree of the motor 3a separated off from the drive control unit 2a is determined (Step S93), and then, if it is not important in the rotary electric machine control device 1 or in the system ("No" in Step S93), the flow moves to Step S13 that has been described in Embodiment 1.

In contrast, when, as has been assumed in this example, the motor 3a is important in the system ("Yes" in Step S93), the relay 4bb is made open while the relay 4ba is closed (Step S94). Accordingly, the drive control unit 2b changes into a component serving to control the motor 3a in place of the motor 3b (Step S95). Thus, the control of the systemically important motor 3a is continued.

With respect to the motor 3b substitutively separated off from the drive control unit 2b, its stop-position information is acquired by the drive control unit 2b (Step S96), and whether the stop position of the motor 3b is proper or not is determined on the basis of the thus-acquired stop-position information (Step S97). If it is determined not to be proper ("No" in Step S97), the relay 4ba is made open while the relay 4bb is closed, thus making it possible to temporarily control the motor 3b by the drive control unit 2b in its regular drive system, etc (Step S98). Then, the stop position of the motor 3b is adjusted by the drive control unit 2b (Step S99), and then the flow moves to the control of the motor 3a, again (Step S94).

Thereafter, with respect to the motor 3b to which power supply from the drive control unit 2b is suspended, its position is observed appropriately (repetition of Steps S96 to S97) and, where necessary, the relay 4ab is made open while the relay 4bb is closed, again, and then adjustment in the position of the motor 3b is performed (Steps S98 to S99).

In this manner, when a failure occurs with respect to the systemically important motor 3, the operation of the motor 3 is continued instead using the drive control unit 2 in the motor system line other than its regular motor system line, so that it is also possible to stably control the servomotors by adjusting the stop position of the motor 3 to be stopped. Namely, even when the connection path is established not temporarily but continuously, there is provided an effect similar to that by multiplexing.

It is noted that the systemically important motor 3 is exemplified by a motor for use in a brake system of, for example, a vehicle, or the like. With respect to the brake system of a vehicle, it is recognized that, when the drive wheels and the non-drive wheels are compared with each other, a higher braking performance of the vehicle will be achieved by the drive wheels under continuous brake control. When applying this to Embodiment 7, there is provided, for example, a configuration in which the motor 3a is located on the drive wheel side and the motor 3b is located on the non-drive wheel side. In that case, at the occurrence of a failure in the drive control unit 2a, it is systemically preferable that the motor 3a be controlled continuously by using the drive control unit 2b.

In this manner, when the important degrees of the motors 3 in terms of configuration of the system are clear beforehand, it suffices that one of the important degrees can be automatically determined according to the part where a failure has occurred. In another aspect, when the important degree varies according to a situation in use, the important degree may be determined at the time when a failure occurs.

It is noted that, in this Embodiment and the respective foregoing Embodiments, in a case where the important degrees of the motors 3 are specified beforehand, it is allowed not to provide the relay, for example, for the motor that is unnecessary to be subject to multiplexing. Specifically, in FIG. 1, when no multiplexing is required for the motor 3b, the relay 4ab may be omitted. In such a case, the motor 3b is not remedied when a failure occurs in the drive control unit 2b; however, when a failure occurs in the drive control unit 2a, it is possible to cause the motor 3a to be adjusted in stop position or to be driven and controlled, by the drive control unit 2b.

Figure 14:
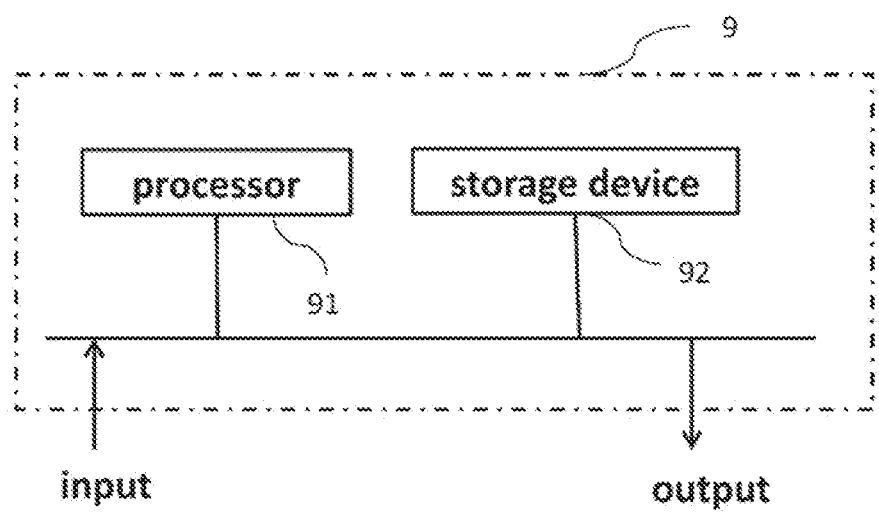
FIG. 14 is a block diagram showing a configuration example of a cooperative control unit in the rotary electric machine control device according to each of Embodiments.

Further, with respect to the cooperative control unit 9 for executing cooperative control of the plurality of the motor system lines in the respective Embodiments as well as determination of the important degree in this Embodiment 7, it is conceivable to configure it, as shown in FIG. 14, with one hardware including a processor 91 and a storage device 92. Though not illustrated, the storage device 92 includes a volatile memory unit such as a random access memory or the like, and a non-volatile auxiliary memory unit such as a flash memory or the like. Further, a hard disk-type auxiliary memory unit may be included in place of the flash memory. The processor 91 executes programs inputted from the storage device 92. In this case, the programs have been inputted to the processor 91 from the auxiliary memory unit through the volatile memory unit. Further, the processor 91 may output data such as a calculation result or the like, to the volatile memory unit in the storage device 92, and may store the data in the auxiliary memory unit through the volatile memory unit.

It should be noted that, in this application, exemplary embodiments are described; however, various characteristics, configurations or functions that are described in these embodiments, are each not limited to being applied to a specific embodiment, and may be applied singularly or in any of various combinations thereof to an embodiment. Accordingly, an infinite number of modified examples that are not exemplified here are supposed within the technical scope disclosed in the present description. For example, such cases shall be included where at least one configuration element is modified, and where at least one configuration element is added or omitted.

For example, the bridge circuit 23 may have another configuration so long as it is an inverter circuit that outputs AC power with an intended frequency to the motor 3, and thus it may be, other than a DC-AC inverter exemplified above, an AC-AC inverter. Furthermore, the motor 3 is not limited to an AC servomotor exemplified above, and may be a DC servomotor. If this is the case, a power conversion circuit for driving and controlling the DC servomotor may have a circuit configuration which is different to that in the drive control unit 2 exemplified above, and represented by a DC-DC converter. Namely, it is not limited to an inverter circuit and may be a circuit that controls DC power, and accordingly, it only has to be a power conversion circuit that converts power received from a power source, regardless of whether it is DC or AC power, into power for controlling rotation of the motor 3 of a servo type.

Further, with respect, for example, to the foregoing cooperative control unit 9, it is not required to be constructed as hardware independent of the drive control unit, and its functions may be imparted to the microcomputer 21 in the drive control unit 2. If this is the case, it is allowable that one of the microcomputers 21 in the plurality of the drive control units 2 is designated as a master, and another microcomputer is designated as a slave.

As described above, in accordance with the rotary electric machine control device 1 according to each of Embodiments, it is configured to include: a plurality of mutually-independent motor system lines, each having the motor 3 with a servo-mechanism and the drive control unit 2 for driving and controlling the motor 3; and a cooperative control mechanism (the cooperative control unit 9, the relays 4) which, when occurrence of a failure of the drive control unit 2 (for example, the drive control unit 2a) is detected in one motor system line in the plurality of the motor system lines, establishes a connection path (for example, the relay 4ba or the relay 4b is closed) for causing the motor 3 (for example, the motor 3a) in said one motor system line where the occurrence of the failure has been detected, to be driven using at least one part (the microcomputer 21b, or the microcomputer 21b+the driver 22b, or the microcomputer 21b+the driver 22b+the bridge circuit 23b) of the drive control unit 2 (for example, the drive control unit 2b) in another motor system line in that motor system lines. Thus, it is possible to stably control the servomotors, while reducing enlargement of the system.

In a particular aspect, the cooperative control mechanism is configured to interrupt the established connection path (for example, to make the relay 4ba open) after adjusting, by way of the established connection path (for example, the relay 4ba is being closed), a stop position of the motor 3 (for example, the motor 3a) in said one motor system line where the occurrence of the failure has been detected. Thus, although said another motor system line is suspended temporarily, since the motor 3 in the motor system line where the failure has occurred will get a proper position, said another motor system line is, thereafter, allowed to be restored without difficulty. Furthermore, it is possible to perform proper operations with said another motor system line after being restored.

In another aspect, the drive control unit 2 in each of the plurality of the motor system lines has, as its components, a power conversion circuit (the bridge circuit 23) for outputting power for driving and controlling, examples of which include AC power and DC power, to the motor 3, the driver 22 for driving the power conversion circuit, and the microcomputer 21 for controlling operations of the driver 22, and the cooperative control mechanism is configured to have: a switch (for example, the relay 4ba or the relay 4b) provided in an interconnection which connects, between the output end of the microcomputer 21b in said another motor system line (for example, the system line of the motor 3b) and the input end of the driver 22a in the motor system line where the occurrence of the failure has been detected (for example, the system line of the motor 3a), between the output end of the driver 22b in said another motor system line and the input end of the power conversion circuit (the bridge circuit 23a) in the motor system line where the occurrence of the failure has been detected, or between the output end of the power conversion circuit (the bridge circuit 23b) in said another motor system line and the input end of the motor 3a in the motor system line where the occurrence of the failure has been detected; and a cooperative control unit 9 for controlling operations of the switch, the drive control unit 2a in the motor system line where the occurrence of the failure has been detected and the drive control unit 2b in said another motor system line, in a cooperative manner; to thereby control interruption and establishment of the connection path by switching that switch. Thus, establishment and interruption of the connection path are controlled easily, so that it is possible, while reducing enlargement of the system that employs servomotors and that is used, in particular, for vehicle control, to stably control the servomotors.

When the cooperative control mechanism is configured: to have secondary switches (the relay 4aa, the relay 4bb and the relay 4cc) each provided for each of the plurality of the motor system lines and in one of the respective interconnections in that motor system line which connect between the microcomputer 21 and the driver 22, between the driver 22 and the power conversion circuit (the bridge circuit 23), and between the power conversion circuit (the bridge circuit 23) and the motor 3; and to turn off the secondary switch in the motor system line where the occurrence of the failure has been detected (for example, the relay 4aa in the case of the system line of the motor 3a), it is possible to shut off an erroneous output to the motor 3 even when such a drive control unit 2 is used which outputs, even if it is suspended, erroneous power toward the motor 3.

In a different aspect, when, in the plurality of the motor system lines, there are two or more motor system lines (for example, the system lines of the motors 3b, 3c) other than the motor system line where the occurrence of the failure has been detected (for example, the system line of the motor 3a), and the cooperative control mechanism is configured to select, out of said two or more motor system lines, the motor system line having the motor of which driving and controlling can be stopped or temporarily stopped, as a candidate of said another motor system line, it is possible to prevent the motor 3 that is difficult to be stopped, from being erroneously stopped, so that the reliability of the system as a whole is enhanced.

In that case, when, as described in Embodiment 3, the cooperative control mechanism is configured so that, if it is difficult to establish the connection path between the motor system line selected as the candidate (for example, the system line of the motor 3b) and the motor system line where the occurrence of the failure has been detected (for example, the system line of the motor 3a), the cooperative control mechanism determines, out of said two or more motor system lines, the motor system line (for example, the system line of the motor 3c) other than the motor system line selected as the candidate, as said another motor system line; and establishes a bypass connection path (for example, by closing the relay 4bc) for providing an output from the motor system line (the system line of the motor 3b) selected as the candidate, to the motor system line determined as said another motor system line (the system line of the motor 3c); and then causes the motor in the motor system line determined as said another motor system line, to be driven and controlled using at least one part of the drive control unit 2 (for example, the drive control unit 2b) in the motor system line selected as the candidate; it is possible to simplify the interconnections and the device, and if a failure occurs in one of the drive control units 2, it is possible to perform the foregoing stop control or continuous operation by utilizing the functions of the drive control units in the plurality of different motor system lines.

DESCRIPTION OF REFERENCE NUMERALS AND SIGNS

1: rotary electric machine control device, 2: drive control unit, 3: motor, 4: relay (switch), 9: cooperative control unit (cooperative control mechanism), 21: microcomputer, 22: driver, 23: bridge circuit (power conversion circuit).

The invention claimed is:

1. A rotary electric machine control device, comprising:
a plurality of mutually-independent motor system lines, each having a motor with a servomechanism and a drive controller for driving and controlling the motor; and
a cooperative controller which, when occurrence of a failure of the drive controller is detected in one motor system line in the plurality of the motor system lines, establishes a connection path for causing the motor in said one motor system line where the occurrence of the failure has been detected, to be driven using at least one part of the drive control unit in another motor system line in that motor system lines,
wherein the cooperative controller interrupts the connection path after adjusting, by way of the connection path, a stop position of the motor in said one motor system line where the occurrence of the failure has been detected.

2. The rotary electric machine control device of claim 1, wherein the drive controller in each of the plurality of the motor system lines has a power conversion circuit for outputting power for driving and controlling the motor, a driver for driving the power conversion circuit, and a microcomputer for controlling operations of the driver, each corresponding to said at least one part;
wherein the cooperative controller has:
a switch provided in an interconnection which connects between the microcomputer in said another motor system line and the driver in said one motor system line where the occurrence of the failure has been detected, between the driver in said another motor system line and the power conversion circuit in said one motor system line where the occurrence of the failure has been detected, or between the power conversion circuit in said another motor system line and the motor in said one motor system line where the occurrence of the failure has been detected; and
a cooperative control unit for controlling operations of the switch, the drive controller in said one motor system line where the occurrence of the failure has been detected and the drive controller in said another motor system line, in a cooperative manner; and
wherein interruption and establishment of the connection path are controlled by switching of the switch.

3. The rotary electric machine control device of claim 2, wherein the cooperative controller has secondary switches each provided for each of the plurality of the motor system lines and in one of respective interconnections in that motor system line which connect between the microcomputer and the driver, between the driver and the power conversion circuit, and between the power conversion circuit and the motor; and wherein the secondary switch in said one motor system line where the occurrence of the failure has been detected, is turned off.

4. The rotary electric machine control device of claim 3, wherein, in the plurality of the motor system lines, there are two or more motor system lines other than said one motor system line where the occurrence of the failure has been detected; and wherein, out of said two or more motor system lines, the cooperative controller selects a motor system line having the motor of which driving and controlling can be stopped or temporarily stopped, as a candidate of said another motor system line.

5. The rotary electric machine control device of claim 4, wherein, if it is difficult to establish the connection path between the selected motor system line and said one motor system line where the occurrence of the failure has been detected, the cooperative controller determines, out of said two or more motor system lines, a motor system line other than the motor system line as the candidate, as said another motor system line, and establishes a bypass connection path for providing an output from the motor system line as the candidate, to the motor system line determined as said another motor system line, and then causes the motor in the motor system line determined as said another motor system line, to be driven and controlled using at least one part of the drive controller in the motor system line as the candidate.

6. The rotary electric machine control device of claim 2, wherein, in the plurality of the motor system lines, there are two or more motor system lines other than said one motor system line where the occurrence of the failure has been detected; and wherein, out of said two or more motor system lines, the cooperative controller selects a motor system line having the motor of which driving and controlling can be stopped or temporarily stopped, as a candidate of said another motor system line.

7. The rotary electric machine control device of claim 6, wherein, if it is difficult to establish the connection path between the selected motor system line and said one motor system line where the occurrence of the failure has been detected, the cooperative controller determines, out of said two or more motor system lines, a motor system line other than the motor system line as the candidate, as said another motor system line, and establishes a bypass connection path for providing an output from the motor system line as the candidate, to the motor system line determined as said another motor system line, and then causes the motor in the motor system line determined as said another motor system line, to be driven and controlled using at least one part of the drive controller in the motor system line as the candidate.

8. The rotary electric machine control device of claim 1, wherein, in the plurality of the motor system lines, there are two or more motor system lines other than said one motor system line where the occurrence of the failure has been detected; and wherein, out of said two or more motor system lines, the cooperative controller selects a motor system line having the motor of which driving and controlling can be stopped or temporarily stopped, as a candidate of said another motor system line.

9. The rotary electric machine control device of claim 8, wherein, if it is difficult to establish the connection path between the selected motor system line and said one motor system line where the occurrence of the failure has been detected, the cooperative controller determines, out of said two or more motor system lines, a motor system line other than the motor system line as the candidate, as said another motor system line, and establishes a bypass connection path for providing an output from the motor system line as the candidate, to the motor system line determined as said another motor system line, and then causes the motor in the motor system line determined as said another motor system line, to be driven and controlled using at least one part of the drive controller in the motor system line as the candidate.

10. A rotary electric machine control device, comprising:

a plurality of mutually-independent motor system lines, each having a motor with a servomechanism and a drive controller for driving and controlling the motor; and a cooperative controller which, when occurrence of a failure of the drive controller is detected in one motor system line in the plurality of the motor system lines, establishes a connection path for causing the motor in said one motor system line where the occurrence of the failure has been detected, to be driven using at least one part of the drive control unit in another motor system line in that motor system lines, wherein the drive controller in each of the plurality of the motor system lines has a power conversion circuit for outputting power for driving and controlling the motor, a driver for driving the power conversion circuit, and a microcomputer for controlling operations of the driver, each corresponding to said at least one part;

wherein the cooperative controller has:

a switch provided in an interconnection which connects between the microcomputer in said another motor system line and the driver in said one motor system line where the occurrence of the failure has been detected, between the driver in said another motor system line and the power conversion circuit in said one motor system line where the occurrence of the failure has been detected, or between the power conversion circuit in said another motor system line and the motor in said one motor system line where the occurrence of the failure has been detected; and a cooperative control unit for controlling operations of the switch, the drive controller in said one motor system line where the occurrence of the failure has been detected and the drive controller in said another motor system line, in a cooperative manner; and wherein interruption and establishment of the connection path are controlled by switching of the switch.

11. The rotary electric machine control device of claim 10, wherein the cooperative controller has secondary switches each provided for each of the plurality of the motor system lines and in one of respective interconnections in that motor system line which connect between the microcomputer and the driver, between the driver and the power conversion circuit, and between the power conversion circuit and the motor; and wherein the secondary switch in said one motor system line where the occurrence of the failure has been detected, is turned off.

12. The rotary electric machine control device of claim 11,
wherein, in the plurality of the motor system lines, there are two or more motor system lines other than said one motor system line where the occurrence of the failure has been detected; and
wherein, out of said two or more motor system lines, the cooperative controller selects a motor system line having the motor of which driving and controlling can be stopped or temporarily stopped, as a candidate of said another motor system line.

13. The rotary electric machine control device of claim 12, wherein, if it is difficult to establish the connection path between the selected motor system line and said one motor system line where the occurrence of the failure has been detected,
the cooperative controller determines, out of said two or more motor system lines, a motor system line other than the motor system line as the candidate,
as said another motor system line, and establishes a bypass connection path for providing an output from the motor system line as the candidate, to the motor system line determined as said another motor system line, and then causes the motor in the motor system line determined as said another motor system line, to be driven and controlled using at least one part of the drive controller in the motor system line as the candidate.

14. The rotary electric machine control device of claim 10,
wherein, in the plurality of the motor system lines, there are two or more motor system lines other than said one motor system line where the occurrence of the failure has been detected; and
wherein, out of said two or more motor system lines, the cooperative controller selects a motor system line having the motor of which driving and controlling can be stopped or temporarily stopped, as a candidate of said another motor system line.

15. The rotary electric machine control device of claim 14, wherein, if it is difficult to establish the connection path between the selected motor system line and said one motor system line where the occurrence of the failure has been detected,
the cooperative controller determines, out of said two or more motor system lines, a motor system line other than the motor system line as the candidate,
as said another motor system line, and establishes a bypass connection path for providing an output from the motor system line as the candidate, to the motor system line determined as said another motor system line, and then causes the motor in the motor system line determined as said another motor system line, to be driven and controlled using at least one part of the drive controller in the motor system line as the candidate.

16. A rotary electric machine control device, comprising:
a plurality of mutually-independent motor system lines, each having a motor with a servomechanism and a drive controller for driving and controlling the motor; and
a cooperative controller which, when occurrence of a failure of the drive controller is detected in one motor system line in the plurality of the motor system lines, establishes a connection path for causing the motor in said one motor system line where the occurrence of the failure has been detected, to be driven using at least one part of the drive control unit in another motor system line of the plurality of motor system lines,
wherein, in the plurality of the motor system lines, there are two or more motor system lines other than said one motor system line where the occurrence of the failure has been detected; and
wherein, out of said two or more motor system lines, the cooperative controller selects a motor system line having the motor of which driving and controlling can be stopped or temporarily stopped, as a candidate of said another motor system line.

17. The rotary electric machine control device of claim 16, wherein, if it is difficult to establish the connection path between the selected motor system line and said one motor system line where the occurrence of the failure has been detected,
the cooperative controller determines, out of said two or more motor system lines, a motor system line other than the motor system line as the candidate,
as said another motor system line, and establishes a bypass connection path for providing an output from the motor system line as the candidate, to the motor system line determined as said another motor system line, and then causes the motor in the motor system line determined as said another motor system line, to be driven and controlled using at least one part of the drive controller in the motor system line as the candidate.

* * * * *